(12) United States Patent
Wookey et al.

(10) Patent No.: US 7,181,455 B2
(45) Date of Patent: Feb. 20, 2007

(54) BANDWIDTH MANAGEMENT FOR REMOTE SERVICES SYSTEM

(75) Inventors: Michael J. Wookey, Santa Clara, CA (US); Trevor Watson, Sheffield (GB); Jean Chouanard, Redwood City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 726 days.

(21) Appl. No.: 10/185,558

(22) Filed: Jun. 27, 2002

(65) Prior Publication Data

US 2004/0002978 A1 Jan. 1, 2004

(51) Int. Cl.
*G06F 7/00* (2006.01)
*G06F 15/16* (2006.01)

(52) U.S. Cl. .................. 707/10; 370/230; 370/235; 709/249

(58) Field of Classification Search .............. 707/10; 709/246, 249; 370/230, 235, 236
See application file for complete search history.

(56) References Cited

U.S. PATENT DOCUMENTS

| | | | |
|---|---|---|---|
| 5,245,616 A | 9/1993 | Olson | 714/748 |
| 5,432,798 A | 7/1995 | Blair | 714/748 |
| 5,528,677 A | 6/1996 | Butler et al. | 379/196 |
| 5,541,927 A | 7/1996 | Kristol et al. | 370/94.2 |
| 5,677,918 A | 10/1997 | Tran et al. | 371/32 |
| 5,729,537 A | 3/1998 | Billström | 370/329 |
| 5,805,804 A | 9/1998 | Laursen et al. | 395/200.02 |
| 5,884,316 A | 3/1999 | Bernstein et al. | 719/315 |
| 5,892,754 A * | 4/1999 | Kompella et al. | 370/236 |
| 5,905,871 A | 5/1999 | Buskens et al. | 395/200.75 |
| 5,933,140 A | 8/1999 | Strahorn et al. | 345/338 |
| 5,974,417 A | 10/1999 | Bracho et al. | 707/10 |
| 5,987,514 A | 11/1999 | Rangarajan | 709/224 |
| 6,014,437 A | 1/2000 | Acker et al. | 379/219 |
| 6,023,507 A | 2/2000 | Wookey | 380/21 |
| 6,023,698 A | 2/2000 | Lavey, Jr. et al. | 707/10 |
| 6,055,364 A | 4/2000 | Speakman et al. | 395/200.59 |
| 6,085,244 A | 7/2000 | Wookey | 709/224 |
| 6,094,688 A | 7/2000 | Mellen-Garnett et al. | 709/328 |
| 6,097,720 A | 8/2000 | Araujo et al. | 370/355 |
| 6,098,093 A | 8/2000 | Bayeh et al. | 709/203 |

(Continued)

OTHER PUBLICATIONS

G. Cugola, E. Di Nitto and A Fuggetta, "Exploiting an Event-Based Infrastructure to Develop Complex Distributed Systems" *Software Engineering, 1998. Proceedings of the 1998 International Conference on Kyoto, Japan* Apr. 19-25, 1998.

(Continued)

*Primary Examiner*—John Cottingham
*Assistant Examiner*—Kuen S. Lu
(74) *Attorney, Agent, or Firm*—Hogan & Hartson LLP

(57) ABSTRACT

The system for managing bandwidth in a remote services system provides an infrastructure that enables a customer to control bandwidth utilization in accordance with specified network performance criteria. The architecture is broadly comprised of a bandwidth management system that operates in conjunction with aggregation Mid-level Manager and application Mid-level Managers controlled by the service provider. The customer deployment can be implemented using a single proxy or a plurality of proxies. Customer access to system resources is controlled by a service provider web-access portal controlled by the service provider.

19 Claims, 31 Drawing Sheets

U.S. PATENT DOCUMENTS

| | | | |
|---|---|---|---|
| 6,131,112 A | 10/2000 | Lewis et al. | 709/207 |
| 6,141,759 A | 10/2000 | Braddy | 713/201 |
| 6,145,096 A | 11/2000 | Bereiter et al. | 714/25 |
| 6,148,337 A | 11/2000 | Estberg et al. | 709/224 |
| 6,151,683 A | 11/2000 | Wookey | 714/2 |
| 6,154,128 A | 11/2000 | Wookey et al. | 340/506 |
| 6,167,431 A | 12/2000 | Gillies et al. | 709/203 |
| 6,182,249 B1 | 1/2001 | Wookey et al. | 714/47 |
| 6,185,606 B1 | 2/2001 | Bereiter | 709/206 |
| 6,216,173 B1 | 4/2001 | Jones et al. | 709/302 |
| 6,219,700 B1 | 4/2001 | Chang et al. | 709/222 |
| 6,237,040 B1* | 5/2001 | Tada | 709/246 |
| 6,237,114 B1 | 5/2001 | Wookey et al. | 714/47 |
| 6,243,451 B1 | 6/2001 | Shah et al. | 379/201 |
| 6,275,953 B1 | 8/2001 | Vahalia et al. | 714/11 |
| 6,332,163 B1 | 12/2001 | Bowman-Amuah | 709/231 |
| 6,335,927 B1* | 1/2002 | Elliott et al. | 370/352 |
| 6,338,088 B1 | 1/2002 | Waters et al. | 709/226 |
| 6,347,374 B1 | 2/2002 | Drake et al. | 713/200 |
| 6,349,340 B1 | 2/2002 | Dyer et al. | 709/231 |
| 6,353,854 B1 | 3/2002 | Cromer et al. | 709/224 |
| 6,357,017 B1 | 3/2002 | Bereiter et al. | 714/27 |
| 6,442,571 B1 | 8/2002 | Haff et al. | 707/201 |
| 6,466,976 B1 | 10/2002 | Alles et al. | 709/224 |
| 6,466,981 B1 | 10/2002 | Levy | 709/227 |
| 6,473,794 B1 | 10/2002 | Guheen et al. | 709/223 |
| 6,523,035 B1 | 2/2003 | Fleming et al. | 707/10 |
| 6,552,999 B2* | 4/2003 | Iwase et al. | 370/230 |
| 6,553,129 B1 | 4/2003 | Rhoads | 382/100 |
| 6,615,258 B1 | 9/2003 | Barry et al. | 709/223 |
| 6,621,801 B1* | 9/2003 | Wright et al. | 370/319 |
| 6,633,898 B1 | 10/2003 | Seguchi et al. | 709/201 |
| 6,640,244 B1 | 10/2003 | Bowman-Amuah | 709/207 |
| 6,665,754 B2 | 12/2003 | Mann | 710/52 |
| 6,687,735 B1 | 2/2004 | Logston et al. | 709/203 |
| 6,691,165 B1 | 2/2004 | Bruck et al. | 709/227 |
| 6,691,302 B1 | 2/2004 | Skrzynski et al. | 717/118 |
| 6,711,611 B2 | 3/2004 | Hanhan | 709/218 |
| 6,760,861 B2 | 7/2004 | Fukuhara et al. | 709/203 |
| 6,765,864 B1* | 7/2004 | Natarajan et al. | 370/224 |
| 6,779,030 B1 | 8/2004 | Dugan et al. | 709/223 |
| 6,781,999 B2 | 8/2004 | Eyuboglu et al. | 370/399 |
| 6,785,728 B1 | 8/2004 | Schneider et al. | 709/229 |
| 6,792,461 B1 | 9/2004 | Hericourt | 709/225 |
| 6,816,882 B1 | 11/2004 | Conner et al. | 709/203 |
| 6,822,961 B1* | 11/2004 | Constantinof et al. | 370/395.2 |
| 6,850,893 B2 | 2/2005 | Lipkin et al. | 705/8 |
| 6,856,676 B1 | 2/2005 | Pirot et al. | 379/201.01 |
| 6,868,441 B2 | 3/2005 | Greene et al. | 709/220 |
| 6,895,586 B1 | 5/2005 | Brasher et al. | 719/313 |
| 6,957,260 B1 | 10/2005 | Mighdoll et al. | 709/225 |
| 2001/0004595 A1 | 6/2001 | Dent | 455/435 |
| 2001/0034782 A1 | 10/2001 | Kinkade | 709/219 |
| 2001/0047386 A1 | 11/2001 | Domenikos et al. | 709/203 |
| 2002/0038340 A1 | 3/2002 | Whipple et al. | 709/203 |
| 2002/0042849 A1 | 4/2002 | Ho et al. | 709/329 |
| 2002/0046294 A1 | 4/2002 | Brodsky et al. | 709/246 |
| 2002/0059425 A1 | 5/2002 | Belfiore et al. | 709/226 |
| 2002/0065929 A1 | 5/2002 | Kamentsky et al. | 709/231 |
| 2002/0073236 A1 | 6/2002 | Helgeson et al. | 709/246 |
| 2002/0087657 A1 | 7/2002 | Hunt | 709/217 |
| 2002/0114305 A1 | 8/2002 | Oyama et al. | 370/338 |
| 2002/0136201 A1 | 9/2002 | Buchsbaum et al. | 370/352 |
| 2002/0156871 A1 | 10/2002 | Munarriz et al. | 709/219 |
| 2002/0156975 A1 | 10/2002 | Staub et al. | 711/114 |
| 2002/0174340 A1 | 11/2002 | Dick et al. | 713/178 |
| 2002/0178262 A1 | 11/2002 | Bonnell et al. | 709/225 |
| 2002/0199182 A1 | 12/2002 | Whitehead | 725/1 |
| 2003/0145117 A1 | 7/2003 | Bhat | 709/249 |
| 2003/0237016 A1 | 12/2003 | Johnson et al. | 714/4 |
| 2004/0002978 A1 | 1/2004 | Wookey et al. | 707/10 |
| 2004/0221292 A1 | 11/2004 | Chiang et al. | 719/310 |

OTHER PUBLICATIONS

R. Droms "RFC1541 Dynamic Host Configuration Protocol" *Request for Comments* www.cis.ohio-state.edu/htbin/rfc/rfc1541. html Oct. 1993 (retrieved Dec. 21, 1999).

R. Kowalchuk, R. Hilderman and H. Hamilton "vnews: A Multicast, Multimedia News Service with Virtual Messages" *Computers and Communications, 1996, Conference Proceedings of the 1996 IEEE 15th* Annual International, Mar. 1996.

Fricke, Stefan et al., "Agent Based Telematic Services and Telecom Applications" Communications of the AM, Apr. 2001, vol. 44, No. 4, pp. 43-48.

Glenn, Ariel "Access Management of Web-Based Services" D-Lib Magazine, Sep. 1998, http://www.dlib.org/dlib/september98/millman/09millman.html, printed May 10, 2005, pp. 1-14.

Hoffman, Paul "Designs on Internet Mail, " Putting it Together, Feb./Mar. 1998, pp. 19-23.

"Java Management API Architecture" Sun Microsystems, Inc., Part No.: 805-0084-01, Revision A, Sep. 1996, XP2264630.

"Sun Microsystems JavaBeans" Jul. 24, 1997, Version I, XP2956519.

W. R. Stevens, "TCP/IP Illustrated," Addison-Wesley, vol. 1, pp. 463-464.

D. Comer et al, "Internetworking with TCP/IP Client-Server Programming and Applications," vol. 3, p. 282.

http://dictionary.reference.com/search?q=segmented, printed Apr. 4, 2006.

\* cited by examiner

BANDWIDTH MANAGEMENT FOR REMOTE SERVICES SYSTEM

CROSS REFERENCE TO RELATED APPLICATIONS

This application relates to co-pending U.S. patent application Ser. No. 10/067,040, filed on Feb. 4, 2002, entitled "Remote Services System Management Interface" and naming Michael J. Wookey, Trevor Watson and Jean Chouanard as inventors, the application being incorporated herein by reference in its entirety.

This application relates to co-pending U.S. patent application Ser. No. 10/067,074, filed on Feb. 4, 2002, entitled "Remote Services Message System to Support Redundancy of Data Flow" and naming Michael J. Wookey, Trevor Watson and Jean Chouanard as inventors, the application being incorporated herein by reference in its entirety.

This application relates to co-pending U.S. patent application Ser. No. 10/066,950, filed on Feb. 4, 2002, entitled "Remote Services Delivery Architecture" and naming Michael J. Wookey, Trevor Watson and Jean Chouanard as inventors, the application being incorporated herein by reference in its entirety.

This application relates to co-pending U.S. patent application Ser. No. 10/066,828, filed on Feb. 4, 2002, entitled "Prioritization of Remote Services Messages Within a Low Bandwidth Environment" and naming Michael J. Wookey, Trevor Watson and Jean Chouanard as inventors, the application being incorporated herein by reference in its entirety.

This application relates to co-pending U.S. patent application Ser. No. 10/067,165, filed on Feb. 4, 2002, entitled "Remote Services System Back-Channel Multicasting" and naming Michael J. Wookey, Trevor Watson and Jean Chouanard as inventors, the application being incorporated herein by reference in its entirety.

This application relates to co-pending U.S. patent application Ser. No. 10/066,841, filed on Feb. 4, 2002, entitled "Remote Services System Data Delivery Mechanism" and naming Michael J. Wookey, Trevor Watson and Jean Chouanard as inventors, the application being incorporated herein by reference in its entirety.

This application relates to co-pending U.S. patent application Ser. No. 10/066,914, filed on Feb. 4, 2002, entitled "Remote Services WAN Connection Identity Anti-spoofing Control" and naming Michael J. Wookey, Trevor Watson and Jean Chouanard as inventors, the application being incorporated herein by reference in its entirety.

This application relates to co-pending U.S. patent application Ser. No. 10/066,075, filed on Feb. 4, 2002, entitled "Automatic Communication Security Reconfiguration for Remote Services" and naming Michael J. Wookey, Trevor Watson and Jean Chouanard as inventors, the application being incorporated herein by reference in its entirety.

This application relates to co-pending U.S. patent application Ser. No. 10/185,557, filed on Jun. 27, 2002, entitled "Remote Services System Communication Module" and naming Michael J. Wookey, Trevor Watson and Jean Chouanard as inventors, the application being incorporated herein by reference in its entirety.

This application relates to co-pending U.S. patent application Ser. No. 10/186,073, filed on Jun. 27, 2002, entitled "Remote Services System Relocatable Mid Level Manager" and naming Michael J. Wookey, Trevor Watson and Jean Chouanard as inventors, the application being incorporated herein by reference in its entirety.

This application relates to co-pending U.S. patent application Ser. No. 10/186,106, filed on Jun. 27, 2002, entitled "Remote Services System Service Module Interface" and naming Michael J. Wookey, Trevor Watson and Jean Chouanard as inventors, the application being incorporated herein by reference in its entirety.

FIELD OF THE INVENTION

The present invention relates to remote service delivery for computer networks and, more particularly, to a method and apparatus for managing bandwidth allocation within said remote services system.

BACKGROUND OF THE INVENTION

It is known to provide a variety of services that are delivered remotely to a customer. These services range from point solutions delivering specific service to more complex remote service instantiations supporting multiple services. The technology behind these services has a number of things in common: they are generally a good idea; they provide a valuable service to a set of customers; and, they are generally isolated from one another.

The number of remote services available show the need and demand for such services. However, the fragmentation of the services reduces the overall benefit to the service provider as well as to the customer. The customer is presented with an often confusing issue of which services to use, why the services are different and why the service provider cannot provide a single integrated service.

In the remote services system, it is important to provide a process for allocating and managing bandwidth. Many customers do not have high bandwidth links to the Internet and it is unacceptable for the remote services system to take over most of this available bandwidth to send large blocks of data. One of the difficulties in this environment is knowing exactly how much bandwidth to allocate to the remote services system. Too much bandwidth could swamp the customer network and too little bandwidth allocation could cause the remote services system to underutilize a fast connection. It is important, therefore, to provide a way for the customer to configure bandwidth.

Another related problem is that of managing bandwidth utilization on a customer network when there are multiple senders. In this context, it is important to have an efficient method for aggregating the bandwidth used by each of these senders and to then control (or limit) the amount of data these senders can transmit (or receive). Finally, large data transfers tend to be of low priority, while short messages in the remote services system tend to be of much higher priority (systems management alarms, for example) which need to get to the service provider with minimal delay. A remote services system should provide a process to prioritize short, urgent messages over longer, less urgent bulk data transfers to optimize data flow between the system components.

SUMMARY OF THE INVENTION

The system for managing bandwidth allocation within a remote services system provides an infrastructure for ensuring that urgent data, such as messages, can be rapidly communicated to system components while also ensuring that the system bandwidth is optimized to accommodate the transfer of larger, less urgent data files. The architecture is broadly comprised of a bandwidth management system that operates in conjunction with aggregation MLMs and application MLMs controlled by the service provider. The customer deployment can be implemented using a single proxy or a plurality of proxies. Customer access to system resources is controlled by a service provider web-access portal controlled by the service provider.

The service provider's bandwidth management system optimizes real-time bandwidth and maintains quality of service control in accordance with predetermined parameters. Messages are prioritized in accordance with a queuing protocol that ensures that the most urgent data is transmitted first. A throttle control, operating in conjunction with the queuing system, controls access to the system bandwidth. Throttle control in the customer deployment is provided by the proxies. On the service provider side, throttle control is provided by the aggregation MLMs. A "throttle changes" back-channel communications path allows the system to control system connectivity and bandwidth allocation.

The default values for bandwidth allocated to the system is part of the initial customer registration and can change or be refined through the service provider web administration portal. Changes are pushed down to the system infrastructure components through the back-channel while configuration values for the service provider bandwidth management system are stored on a Lightweight Directory Assistance Protocol server residing in the service provider's data center. The data prioritization system is scalable and can be adapted to accommodates a plurality of deployments of system components with minimal reconfiguration.

BRIEF DESCRIPTION OF THE DRAWINGS

The present invention may be understood, and its numerous objects, features, and advantages made apparent to those skilled in the art by referencing the accompanying drawings.

DETAILED DESCRIPTION

Figure 1:
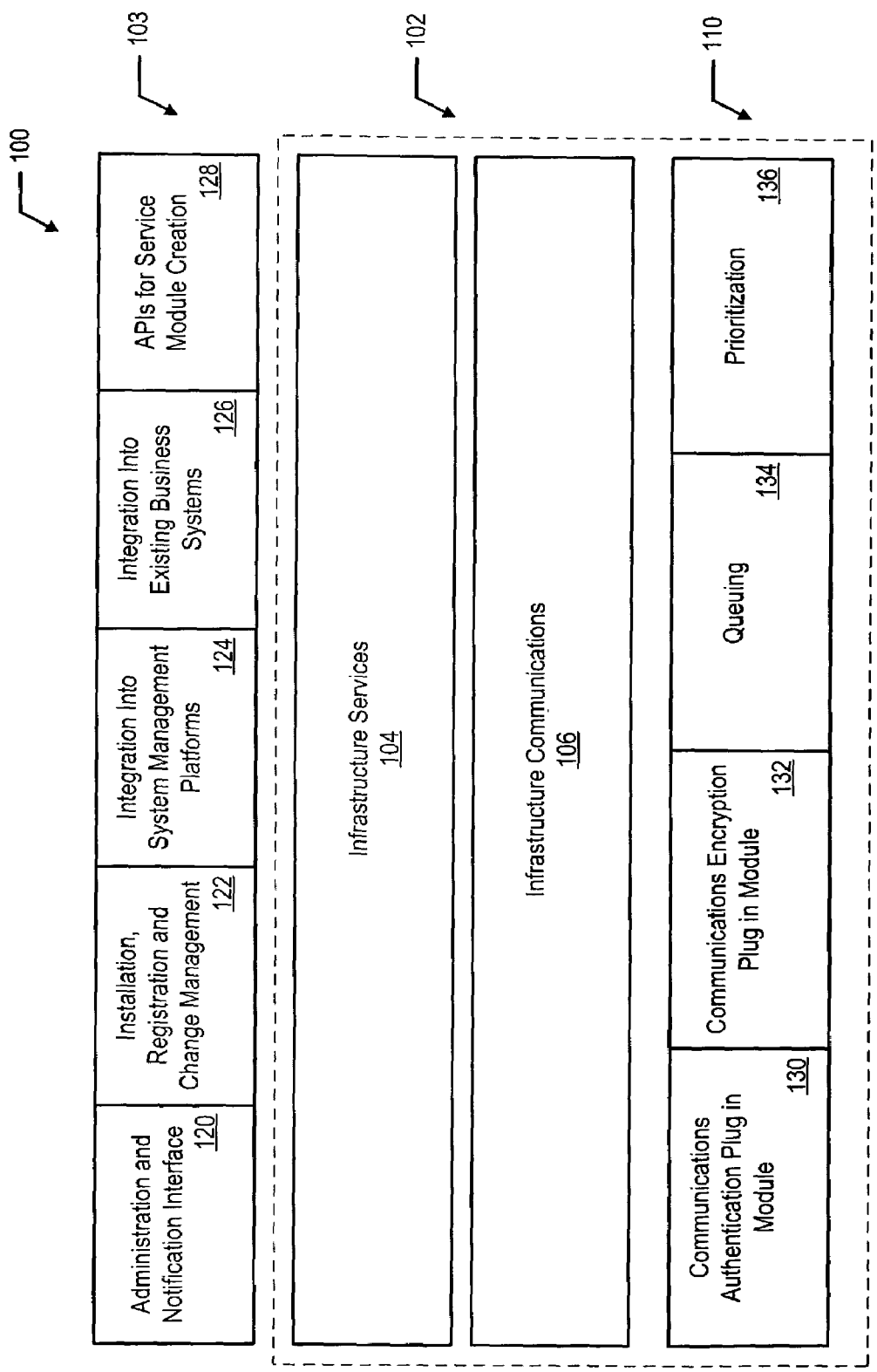
FIG. 1 shows a block diagram of a remote service delivery architecture.

FIG. 1 shows a block diagram of an architecture for a remote service delivery system 100 that meets the needs of both the service provider and the customer. The architecture of the present invention is modularized to provide broad support for both the customer and the service provider in terms of evolution of service functionality to the architecture and within the architecture.

The architecture is broadly comprised of the remote service infrastructure 102, a group of service modules 103 and a plurality of communications modules 110. The remote services infrastructure 102 provides reliable remote service delivery and data management. The remote services infrastructure 102 supports the needs of a service creator by focusing the service creator on the needs and the design of the service by eliminating the need for the service creator to be concerned about how data is transferred and managed to and from a customer site.

The remote services infrastructure 102 provides an interface to support the development of services that use a set of common service parameters to develop customized services for a specific service provider or customer. The infrastructure 102 is separately segmented from, but actively interacts with, the service modules 103.

Within the group of software modules 103 are individual software modules that analyze data collected by the remote services infrastructure 102 and provides service value based on that data to a customer. Thus, the remote services infrastructure 102 and the service modules 103 can be differentiated as follows: the remote services infrastructure 102 is concerned with how data is collected, while the service module 103 is concerned with what is done with the data.

The remote services infrastructure 102 includes an infrastructure services portion 104 and an infrastructure communications portion 106. The infrastructure services portion 104 interacts with the plurality of service modules 103, as described in greater detail below. The remote services infrastructure 102 provides a set of application program interfaces (API's) that are used by a service module developer to leverage common services of the infrastructure such as database access, software delivery and notification services. The infrastructure communications portion 106 includes a plurality of communications modules 110.

The infrastructure services portion 104 interacts with a plurality of service modules 103. Examples of service modules that the remote services architecture may include are an administration and notification interface module 120, an installation, registration and change management module 122, an integration into system management platforms module 124, an integration into existing business systems module 126 and an API's for service module creation module 128. The administration and notification interface 120 allows a customer and service provider to control the remote services infrastructure. The installation, registration and change management module 122 supports the infrastructure and service modules deployed on top of the infrastructure. The module 122 may include automatic registration of new software components, delivery of software and detection of changes within an environment. The integration into systems management platforms module 124 provides an integration point to systems management platforms in general. The integration into existing business systems module 126 allows the remote services infrastructure 102 to integrate into existing business systems to leverage data, processing capacities, knowledge and operational process. The module 126 allows the infrastructure 102 to integrate into the required business systems and provides interfaces to the service module creator to use those systems. The API's for service module creation module 128 allows a service module creator to abstract the complexity of remote data management. The module 128 provides an API of abstracted services to the service module creator.

The infrastructure communications portion 106 provides an abstraction of different protocol and physical network options. Examples of protocol options include an HTTP protocol and an email protocol. Examples of physical network options include Internet based communications, private network based communications and fax communications. The different protocol and physical network options are provided to meet the needs of as many customers as possible.

The infrastructure communications portion 106 supports a number of plug-in communications modules 110. Examples of the communications modules 110 include a communications authentication module 130, an encryption module 132, a queuing module 134, and a prioritization module 136. The communications authentication module 130 is related to the communications protocol that is used and provides the customer with authentication of a communication session. The encryption module 132 is related to the protocol being used and provides encryption of the data stream. The queuing module 134 provides the ability of the infrastructure to queue data being sent through the infrastructure to provide data communications integrity. The prioritization module 136 provides the ability for data within the system to be prioritized for delivery.

Figure 2:
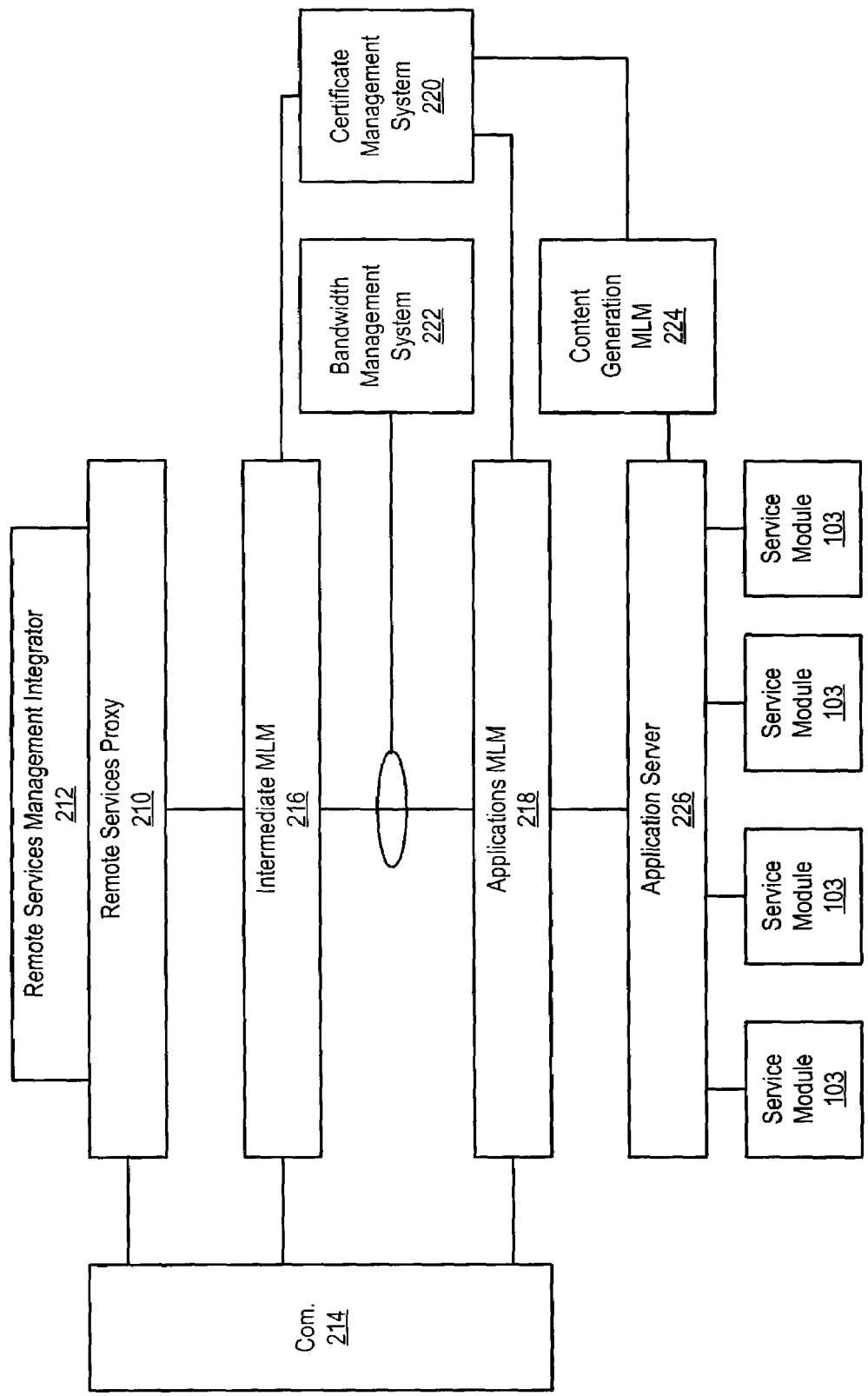
FIG. 2 shows a schematic block diagram of the components relating to the remote services infrastructure.

Referring to FIG. 2, the remote services infrastructure architecture 205 includes a plurality of components. More specifically, the remote services infrastructure architecture 205 includes a remote services proxy 210, a remote services system management integrator 212, a remote services communications module 214, an intermediate mid level manager (MLM) 216 (which may be a customer MLM or an aggregation MLM), an applications MLM 218, a certificate management system 220, a bandwidth management system 222, a remote services content generation MLM 224, a remote services application server 226. The remote services infrastructure architecture 205 interacts with a plurality of external service modules 103.

The remote services proxy 210 provides an API to the systems management systems. This API supports data normalization to the remote services data format. The remote services proxy 210 also provides receptors for the communications modules and in turn provides communications flow management using queuing. The remote services proxy 210 also manages allocation of remote services identifiers (ID's), which are allocated to each component of the remote services infrastructure, and the support instances that are registered with the remote services system 100.

The remote services system management integrators 212 are written to a remote services integrator API supported by the remote services proxy 210. One remote services proxy 210 can support many integrators (also referred to as integration modules). The integration modules provide the glue between the remote services system 100 and the systems management platform. There is at least one integration module for each support systems management platform.

The remote services communications modules 214 provide protocol, encryption and communications authentication. These modules plug-in through a semi-private interface into the remote services proxy 210, the intermediate MLM 216 and the remote services application MLM 218.

The intermediate MLM 216 may be either a customer MLM or an aggregation MLM. The remote services customer MLM is an optional deployable component. The remote services customer MLM provides a higher level of assurance to the customer-deployed environment, providing transaction integrity, redundancy and data queue management. The remote services customer MLM also provides an extensible environment through an API where service module components can be deployed. When no customer MLM is deployed, the aggregation MLM, hosted by the remote services provider and handling multiple customers, provides the data queue management, transaction integrity and redundancy. While the customer MLM is very similar to an aggregation MLM, a customer MLM may be required by a service module that needs to be localized. An aggregation MLM, being shared by multiple customers, may not be customizable.

The applications MLM 218 provides a series of functions that can exist on different MLM instantiations as applicable. The applications module provides data normalization, integration with the mail server data flow and integration with the certificate management system 220. This module acts as the gateway to the remote services application server 226 and controls data access.

The certificate management system 220 provides management of certificates to verify connection authentication for the remote services system 100. The certificate management system 220 may be horizontally scaled as necessary to meet the load or performance needs of the remote services system 100.

The bandwidth management system 222 provides control over bandwidth usage and data prioritization. The bandwidth management system 222 may be horizontally scaled as necessary to meet the load or performance needs of the remote services system 100.

The remote services content generation MLM 224 provides HTML content based on the data held within the remote services application server 226. This module provides a high level of HTML caching to reduce the hit rate on the application server for data. Accordingly, visualization of the data is done through the content generation MLM 224. Separating the visualization processing in the content generation MLM 224 from the data processing in the applications server 226 provides two separate scale points.

The remote services application server 226 provides the persistent storage of remote services infrastructure information. The application server 226 also provides the data processing logic on the remote services infrastructure information as well as support for the service module API to create service module processing within the application server 226. The application server 226 provides access to directory services which support among other things, IP name lookup for private network IP management. The application server 226 also provides access to the service modules 103.

In operation, the remote services proxy 210 uses the communication module 214 to connect to the intermediate MLM 216, whether the intermediate MLM is a customer MLM or an aggregation MLM. The applications MLM 218 and the intermediate MLM 216 use the certificate management system 220 to validate connections from customers. Dataflow bandwidth between the intermediate MLM 216 and the applications MLM 218 is controlled by the bandwidth management system 222. Data that has been formatted by the applications MLM 218 is sent on to the application server 226 for processing and persistent storage.

The content generation MLM 224 provides visualization and content creation for users of the remote services system 100. Remote services infrastructure administration portal logic is deployed to the content generation MLM 224 to provide users of the remote services system 100 with the ability to manage the remote services system 100.

All of the remote services components are identified by a unique remote services identifier (ID). A unique customer remote services ID is generated at customer registration. For remote services infrastructure components, remote services IDs are generated, based on the customer remote services ID, at a component registration phase. For remote services entities reporting to a remote services proxy 210, such as a support instance or an integration module, the remote services ID is allocated by the proxy 210 itself, based on the remote services ID of the proxy 210.

Within the remote services architecture, there are instances where detection, collection and management logic (also referred to as systems management logic) may have already been created by another service module. In this instance, the service module creator reuses this functionality. The reuse then creates a more complex relationship within the system to be managed. The segmentation and re-use of data is available within the architecture. Instrumentation is made up of a large number of small data types. These data types are shared by the different service modules 103 using a publish and subscribe model.

Figure 3:
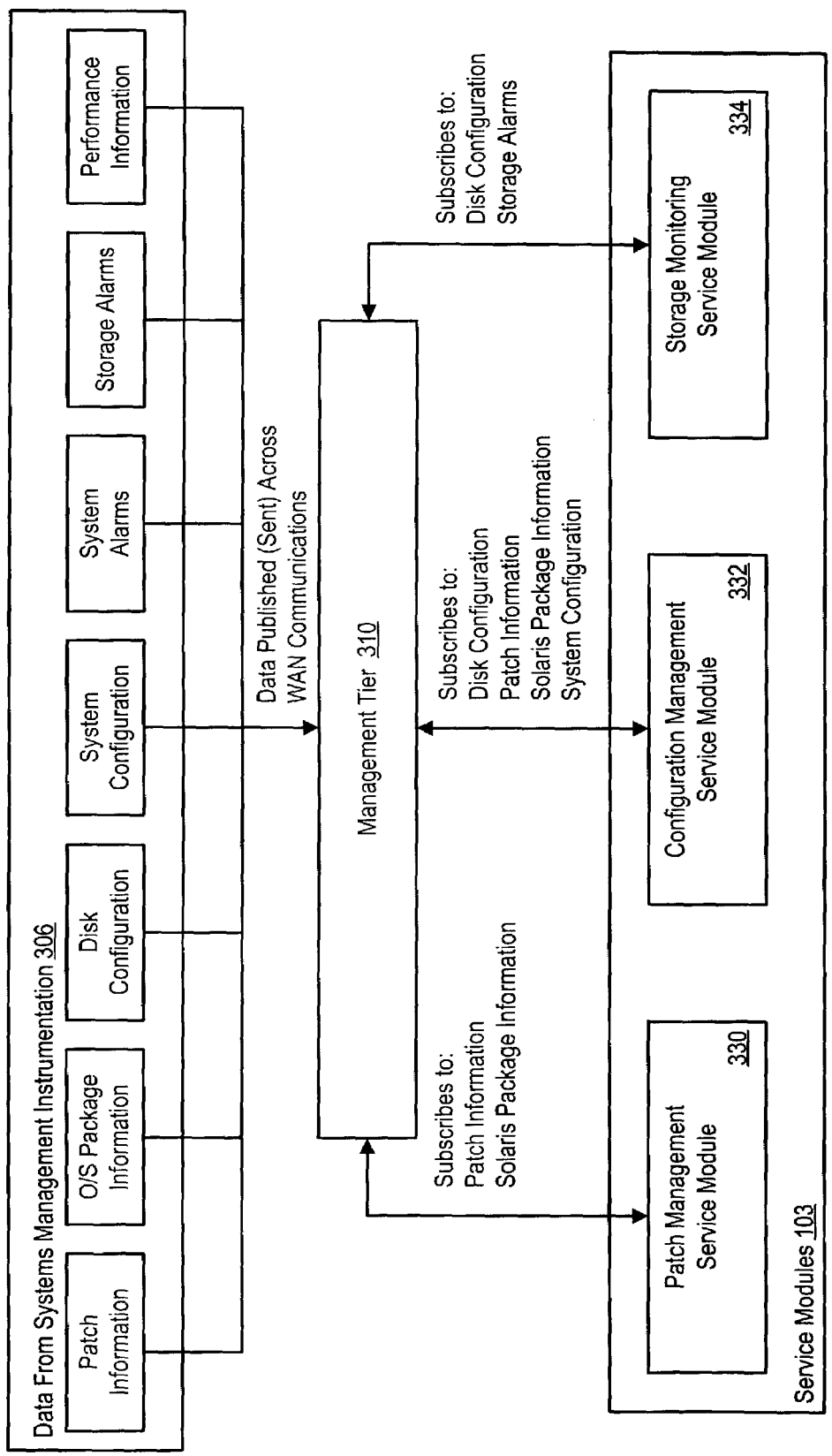
FIG. 3 shows a publish and subscribe example using the remote services delivery architecture.

In a publish and subscribe model, the remote services proxies (and therefore the systems management systems) publish their data to a service provider. The service modules 103 register interest in specific types of data that are needed to fulfill the respective service module processing. FIG. 3 provides an example of the publish and subscribe model using example data and services.

More specifically, data from a systems management instrumentation proxy 306 may include patch information, operating system package information, disk configuration information, system configuration information, system alarms information, storage alarms information and performance information. This information is published via, e.g., a wide area network (WAN) to a management tier 310. Various service modules 103 then subscribe to the information in which they are respectively interested. For example, a patch management service module 330 might be interested in, and thus subscribe to, patch information and operating system package information. A configuration management service module 332 might be interested in, and thus subscribe to, the disk configuration information, the patch information, the operating system package information and the system configuration information. A storage monitoring service module 334 might be interested in, and thus subscribe to, disk configuration information and storage alarms information.

Thus, with a publish and subscribe model, many different types of data are published by a customer using the remote services customer deployed infrastructure. Service modules then subscribe to these data types. More than one service module 103 can subscribe to the same data. By constructing the instrumentation data in a well segmented manner, the data can be shared across many services.

Sharing data across many services reduces duplication of instrumentation. By making data available to newly developed service modules, those service modules need to only identify instrumentation that does not exist and reuse and potentially improve existing instrumentation. Sharing data across multiple services also reduces load on customer systems. Removing the duplication reduces the processing load on the customer's systems. Sharing data across multiple services also reduces development time of service modules 103. As more instrumentation is created and refined, service modules 103 reuse the data collected and may focus on developing intelligent knowledge based analysis systems to make use of the data.

Accordingly, the separation and segmentation of the infrastructure from the service modules enables services to be created in a standardized manner ultimately providing greater value to the customer.

Figure 4:
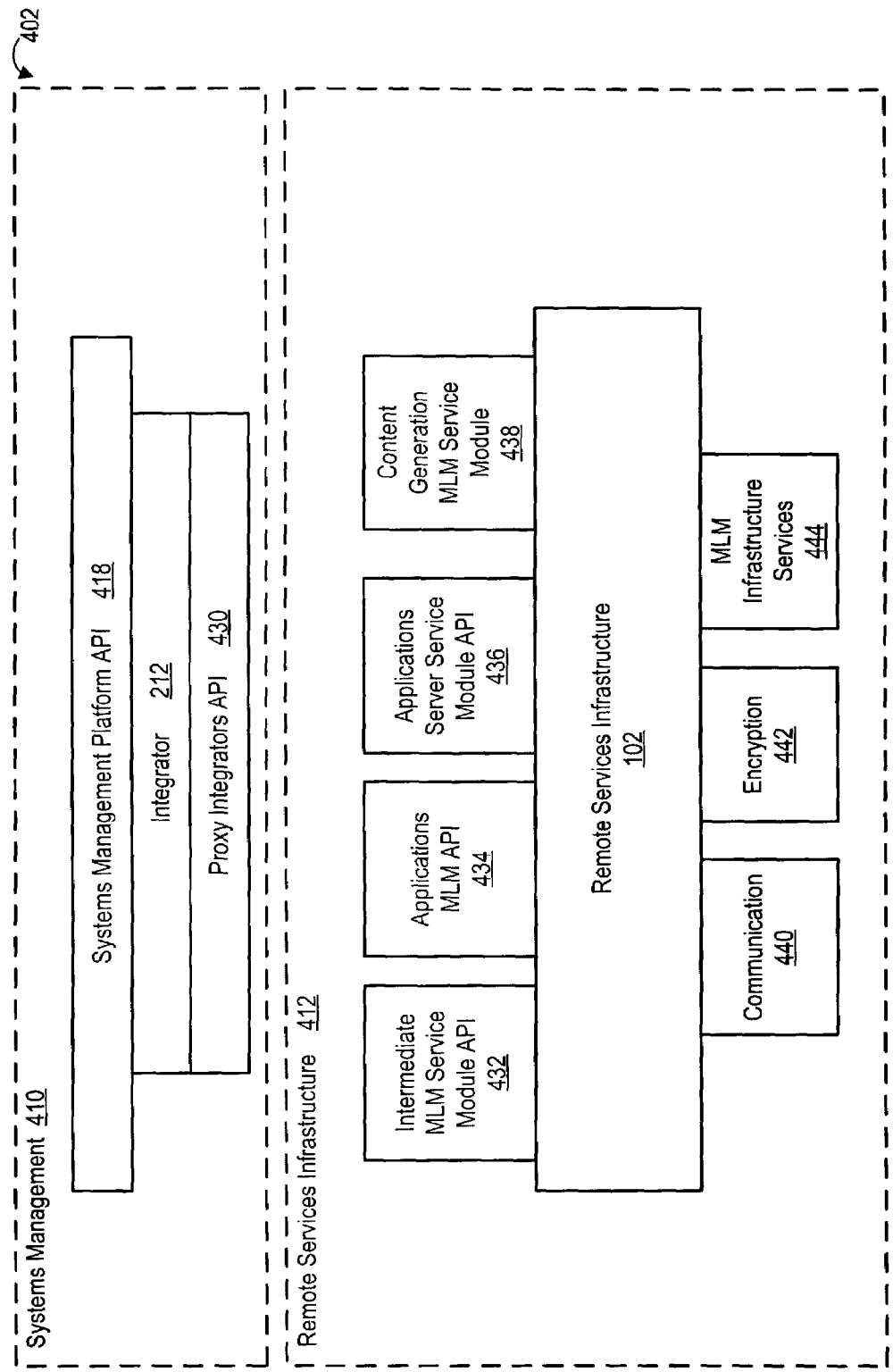
FIG. 4 shows a block diagram of the application program interfaces (API's) of the remote service delivery architecture.

Referring to FIG. 4, the remote services architecture includes a remote services API 402 which may be conceptualized in two areas, systems management API's 410 and remote services infrastructure API's 412.

The systems management API's 410 includes systems management API's 418, integrator 212 and proxy integrators API 430. The proxy integrator API 430 interfaces with integrator module service logic. The integrator module service logic is a general term for the configuration rules that are imparted on the systems management system to collect or detect the information for the integrator 212. While the proxy integrator API's 430 are not technically a part of the remote services system 100, the proxy integrator API 430 is used within the integration modules which form the boundary between the remote services system 100 and the system management. The integration module creator provides the instrumentation to fulfill the collection and detection needs of the service via the systems management API 418.

The proxy integrators API 430 provides an interface between the systems management system and the remote services infrastructure 102. This interface provides a normalization point where data is normalized from the system management representation to a remote services standard. By normalizing the data, the remote services system 100 may manage similar data from different systems management systems in the same way. The proxy integrators API 430 interfaces with the remote services proxy 210 as well as the systems management integrator 212.

The remote services infrastructure API's are used by a service module creator and the systems management integrator 212. The remote services infrastructure API's 412 include an intermediate MLM Service Module API 432, an applications MLM API 434 and an applications server service module API 436 as well as a content generation MLM service module API 438. These API's provide the interface with the remote services infrastructure 102.

The intermediate MLM Service Module API 432 describes a distributed component of the infrastructure. The intermediate MLM service module API 432 allows modules to be loaded into this distributed component that provides mid data stream services such as data aggregation, filtering, etc. The intermediate MLM service module API 432 provides access and control over the data that flows through the intermediate MLM 216 to the service module provider. The intermediate MLM service module API 432 allows intercept of data upstream and on the back-channel to mutation, action and potential blocking by the service modules 103. The intermediate MLM service module API 432 interfaces with a service module creator as well as with the intermediate MLM 216 and intermediate MLM based service modules.

The applications MLM API 434 allows additional modules to be loaded on the applications MLMs. The applications MLM API 424 allows modules to be built into the applications MLMs 218 such as data normalization. The applications MLM API 424 interfaces with the applications MLMs 218 and modules within the applications MLM 218.

The applications server service module API 436 provides all of the needs of a data processing service module. The applications server service module API 436 provides access to many functions including data collected through a database and access to a full authorization schema. The applications service module API 436 is based around the J2EE API. The applications service module API 436 provides a rich interface for service module creators to interact with and build services based on Enterprise Java Beans (EJB's) and data available to them. The application server service module API 436 interfaces with the remote services application server 226 and the service modules 103.

The content generation MLM API 438 is based around the J2EE web container and provides the service module creator a way of building a browser based presentation. The content generation API 428 interfaces with the content generation MLM 224 as well as with MLM generation based service modules.

The remote services infrastructure API's 412 also include a plurality of communication interfaces which are based around the extendibility of the remote services communications system. The communication interfaces include a communication protocol module 440, a communication encryption module 442 and an MLM infrastructure services portion 444. The communications interfaces interface with the remote services proxy 210 as well as all of the remote services system MLM's. The communications interfaces provide an interface between the communications modules and the components that use the communications modules.

The communications protocol module 440 provides support of the application level protocol that is used for the communication through the system. Modules of this type interface to support the use of Email and HTTP communications protocols. The communication protocol module 440 interfaces with remote services communications engineering personnel.

The communications encryption module 442 supports plug-in encryption modules. The plug-in encryption modules can either provide encryption at the protocol level or encryption of the data within the protocol. The communication encryption module 442 interfaces with remote services communications engineering personnel.

The MLM infrastructure services portion 444 represent a number of services that are included within the MLM that provide services that are relevant to the infrastructure 102. These services manage and manipulate the data as it passes through the different parts of the architecture. These services, such as queuing, utilize an API to access and manipulate the API.

Figure 5A:
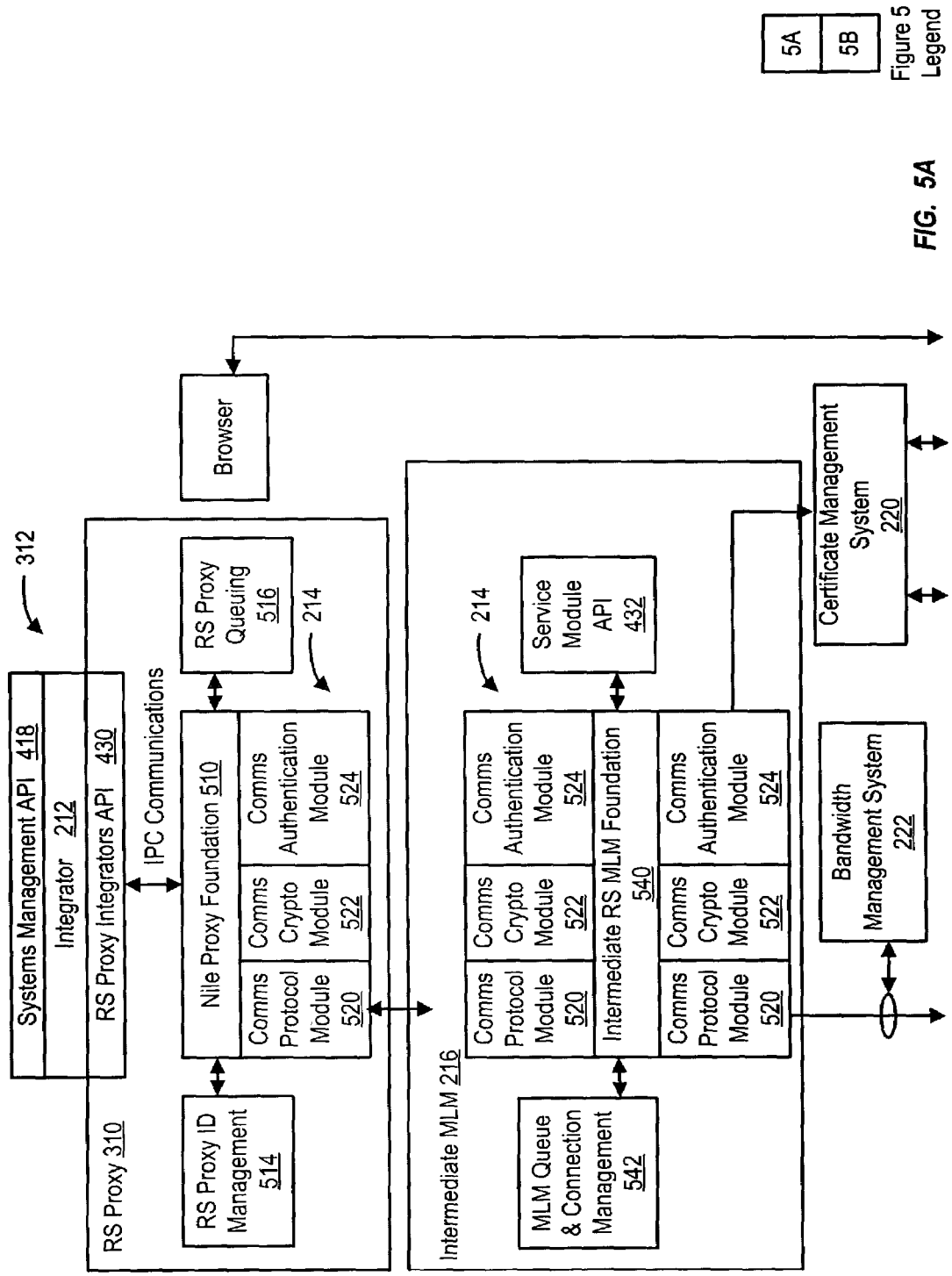
FIGS. 5A and 5B show a more detailed version of the components of FIG. 2.
Figure 5B:
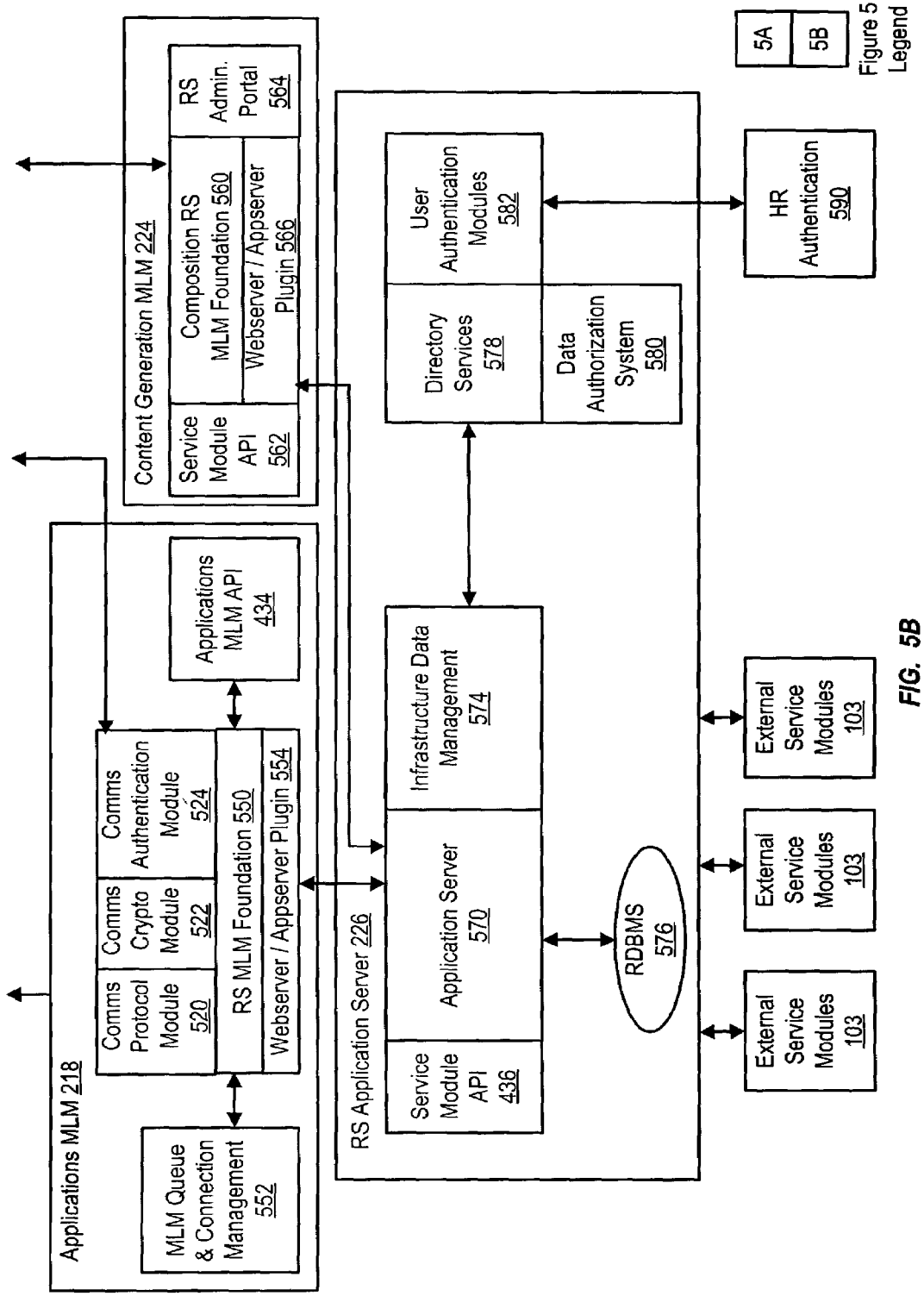

FIGS. 5A and 5B show a more detailed block diagram of the remote services architecture depicted in FIG. 2. Within this more detailed block diagram, the remote services communications modules 214 are shown distributed across the remote services proxy 210, the intermediate MLM 214 and the applications MLM 218.

The remote services proxy 210 includes a remote services proxy foundation module 510 which is coupled to a communications module 214 as well as to a remote services proxy integrator API module 430, a remote services proxy ID management module 514 and a remote services proxy queuing module 516.

The remote services system management integrator 212 includes a systems management API 418 and a remote services integrator 212. The remote services integrator 212 is coupled to the remote services proxy integrators API module 430 of the remote services proxy 210.

Each communication module 214 includes a communications protocol module 520 and a communications crypto module 522. A communications module 214 may also include a communications authentication module 524.

The intermediate MLM 216 includes an intermediate remote services MLM foundation module 540 which is coupled between communication modules 214. The intermediate remote services MLM foundation module 540 is also coupled to a MLM queue and connection management module 542 and an intermediate service module API module 432. Communications modules 214 couple the intermediate MLM 216 to the remote services proxy 210 and the applications MLM 218.

Bandwidth management system 222 controls bandwidth usage and data prioritization on the communications between intermediate MLM 216 and applications MLM 218. Certificate management system 220 is coupled between the communications authentication modules 524 for the intermediate MLM communications module 214 and the applications MLM 218 communications module 214.

The applications MLM 218 includes a remote services MLM foundation module 550 that is coupled to the communications module 214 for the applications MLM 218. The remote services MLM foundation module 550 is also coupled to an MLM queue and connection management module 552 and the applications MLM API module 434 as well as a web server application server plug-in module 554.

Content generation MLM 224 includes a composition MLM foundation module 560. The composition MLM foundation module 560 is coupled to a service content generation module API module 438 and a remote services administration portal 564 as well as a web server application server plug-in module 566.

Remote services application server 226 includes an application server module 570 coupled to an application server service module API 436 and an infrastructure data management module 574. The application server module 570 is also coupled to relational database management system (R17MS) 576. The infrastructure data management module 574 is coupled to a directory services module 578. The directory services module 578 is coupled to a data authorization system module 580 and user authentication modules 582. The user authentication modules 582 are coupled to human resources (HR) authentication module 590. The remote services application server 226 is coupled to a plurality of external service modules 230.

FIGS. 6, 7, 8, 9 and 10 show expanded views of the remote services proxy 210 and remote services system management integrator 212, intermediate MLM 216, applications MLM 218, applications server 226 and content generation MLM 224, respectively.

Figure 6:
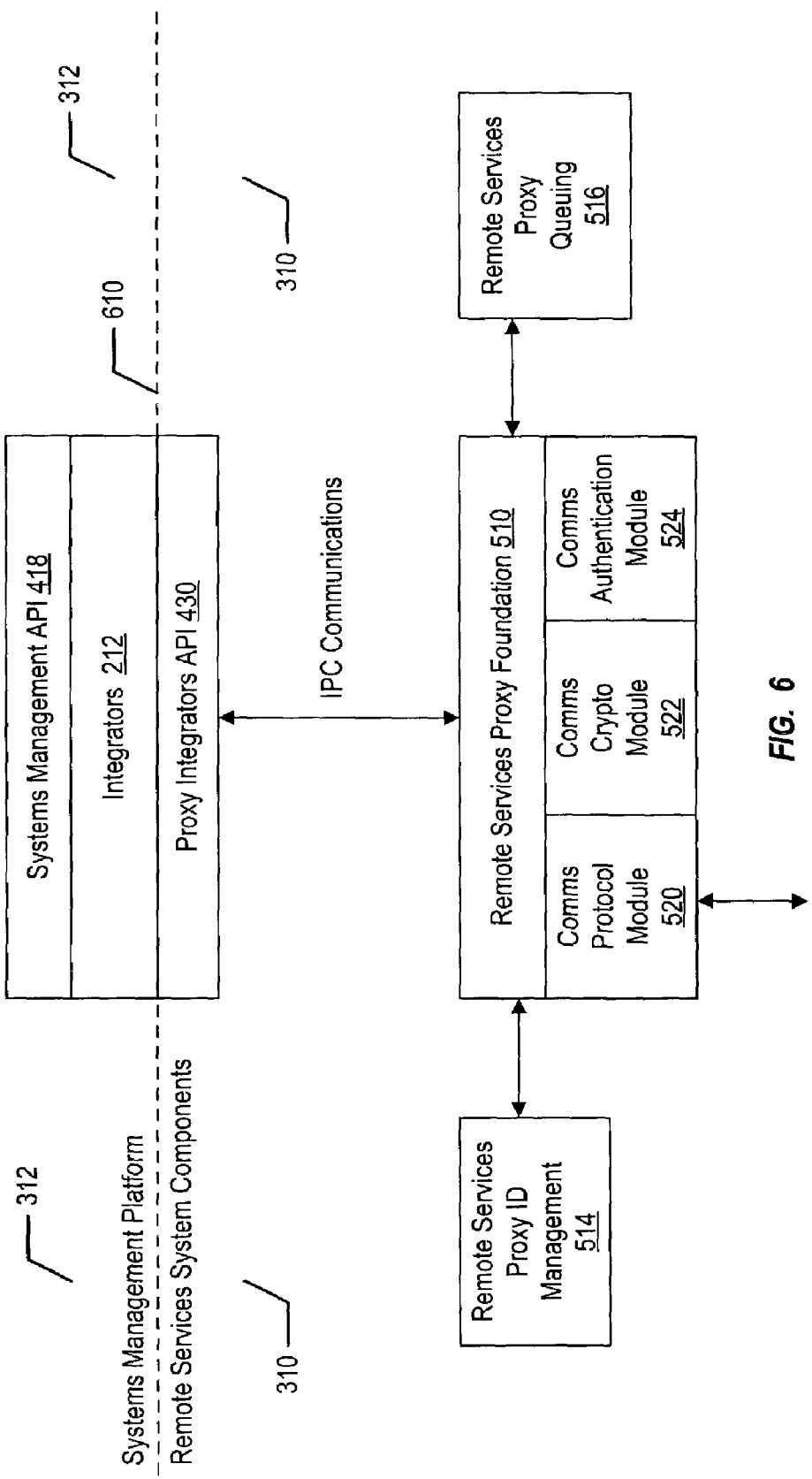
FIG. 6 shows a block diagram of a remote services proxy and a remote services system management integrator.

FIG. 6 shows a block diagram of the remote services proxy 210 and the remote services system management integrator 212. The block diagram shows the delineation between the systems management software and the remote services system components as indicated by line 610.

The remote services proxy 210 provides an API via remote services proxy integrators API 430 which communicates using the operating system's Inter-Process Communication (IPC) implementation with the remote services proxy foundation module 510. This communication allows the API to be implemented with a number of different languages to meet the needs of the systems management developers while leaving a single native implementation of the remote services proxy foundation module 510. Examples of the languages used for the API include Java and C++.

The remote services proxy foundation module 510, together with the API 430, manage data normalization tasks. This ensures that systems management data is carried independently through the system. For example, an event from one type of service, such as a SunMC service, would have the same structure as an event from another type of service, such as the RASAgent service. Accordingly, the service modules may deal with the data types that are specific to the respective service and are independent of their source.

In the remote services architecture, the integrator 212 and proxy 210 are represented by two separate processes (e.g., address spaces). By representing the integrator 212 and the proxy 210 as two separate processes, a faulty integrator 212 is prevented from taking down the whole proxy 210.

The remote services proxy queuing module 516 allows data to be queued for transmission when communications to the intermediate MLM(s) 216 become unavailable. This queuing is lightweight and efficient which in turn reduces the capabilities of length of time data can be queued and of reconnection management. The remote services proxy queuing module 516 provides a number of features that can be used to manage the queue, such as priority and time for data to live.

The remote services proxy ID management module 514 manages the allocation of unique identifiers for the proxy 210 itself and any support instances that are registered through the API. The remote services system 100 relies on the creation of unique ID's to manage individual support instances. This function is provided within the proxy 210 because there is no unique cross platform identifier available within the remote services system 100. The proxy 210 manages the mapping between the systems management ID (e.g., IP address) and the remote services ID, which is keyed off the unique customer ID provided at installation time within the deployed, system.

Figure 7:
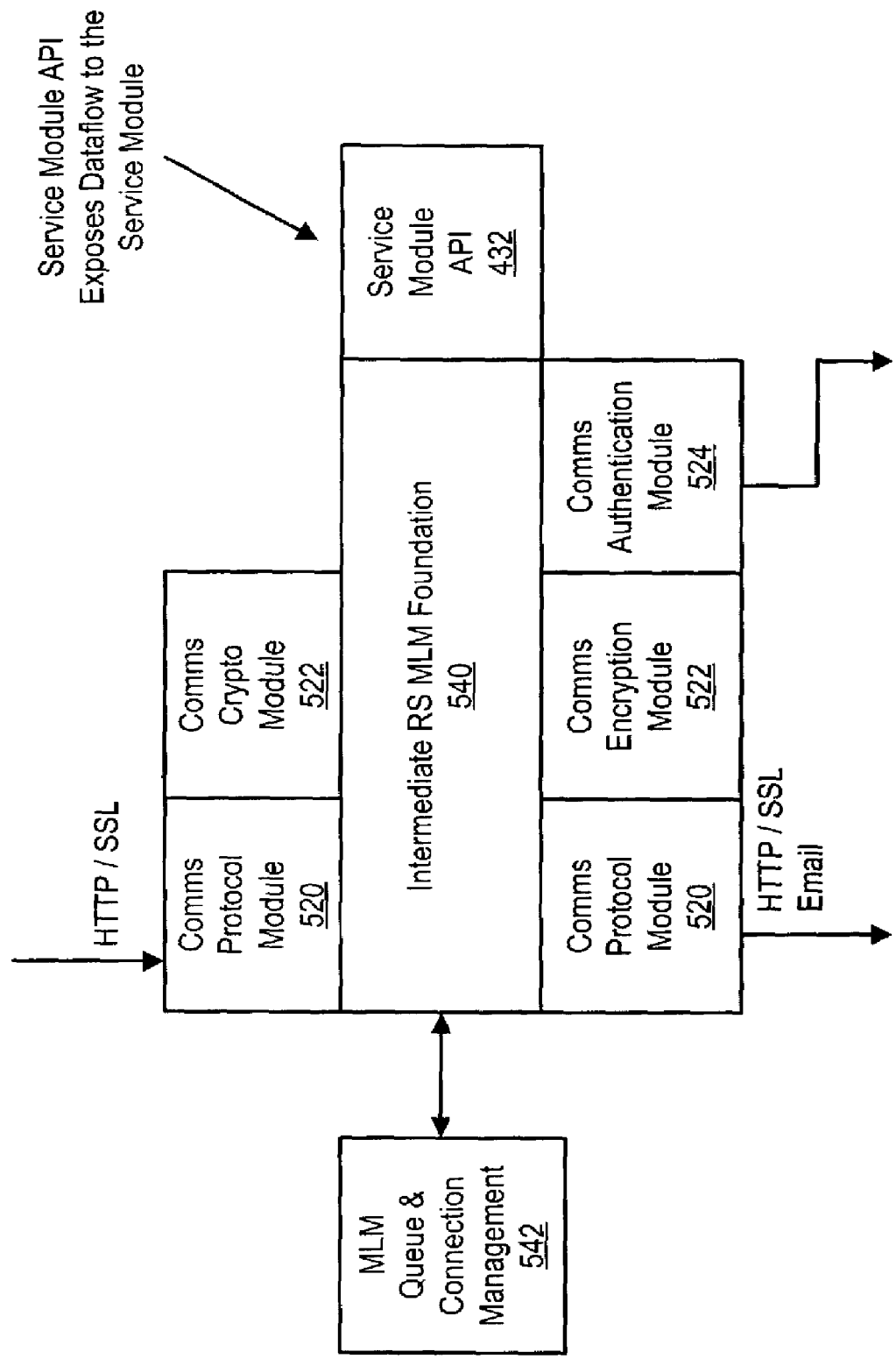
FIG. 7 shows a block diagram of a remote services intermediate mid level manager (MLM).

FIG. 7 shows a block diagram of the remote services intermediate MLM 216. The intermediate MLM may be a customer MLM or an aggregation MLM.

The customer MLM is an optional component that can be deployed to support scaling of both support instances and services as well as provide enhanced availability features for a deployed remote services environment. The intermediate MLM 216 receives information via the HTTP protocol from the remote services proxy 210. This information may optionally be encrypted. Connections are not authenticated by default on the server side, as it is assumed that the connection between the intermediate MLM 216 and the proxy 210 is secure.

The intermediate remote services MLM foundation module 540 exposes the data flow to the service module API 432 where registered service modules can listen for new data of specific types and mutate the data as required. Examples of this function include filtering of certain types of data or data aggregation. The customer MLM does not keep state from an infrastructure perspective. However, the service module could choose to keep persistent state information. The recoverability fail-over support of that state, however, is in the domain of the service module, although the basic session replication features that provide the redundancy features of the infrastructure data flow may be reused.

The queue and connection management module 542 provides a highly reliable secure connection across the wide area network to the service provider based MLM farms. The queue manager portion of module 542 also manages back-channel data that may be intended for specific remote services proxies as well as for the applications MLM 218 itself.

The intermediate remote services MLM foundation module 540 manages the rest of the MLM's roles such as session management, fail-over management and shared queuing for the back-channel.

Aggregation MLM's, while provided by the service provider, function much the same as customer MLM's. Strong security is turned on by default between such MLM's and the remote services proxy 210. Accordingly, a communications authentication module 524 is used on the receiving portion of the intermediate MLM 216.

Figure 8:
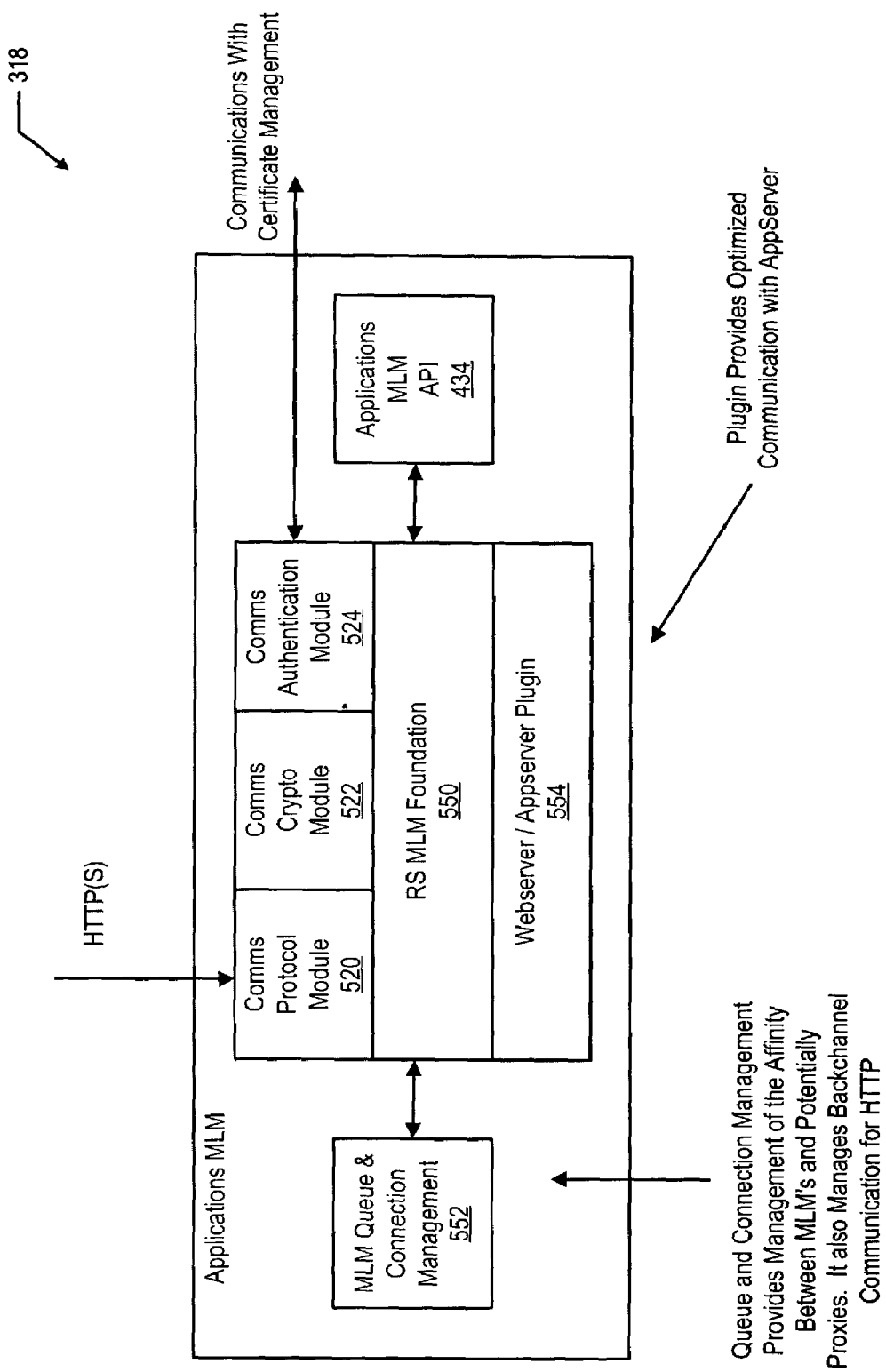
FIG. 8 shows a block diagram of a remote services applications MLM.

Referring to FIG. 8, the remote services application MLM 218 provides several functions (applications) for the remote services system 100. The remote services application 218 hosts applications as well as functioning as a content creation MLM. The host applications within the application MLM 218 include data normalization, customer queue management and remote access proxy. The data normalization application supports normalization and formatting of data being sent to the application server 226. The customer queue management application handles general connections to and from customer remote services deployments. The customer queue management application also manages back-channel requests and incoming request. The remote access proxy application provides a remote access point as well as functioning as a shared shell rendezvous point. The applications MLM 218 uses the application server plug-in to communicate directly with the application server 226.

The communications authentication module 554 communicates with the certification management system 220 to validate incoming connections from customers. Each customer is provided a certificate by default although more granular allocations are available. Certificates are distributed at installation time as part of the installation package for both the remote services proxy module and for the remote services customer MLM.

Figure 9:
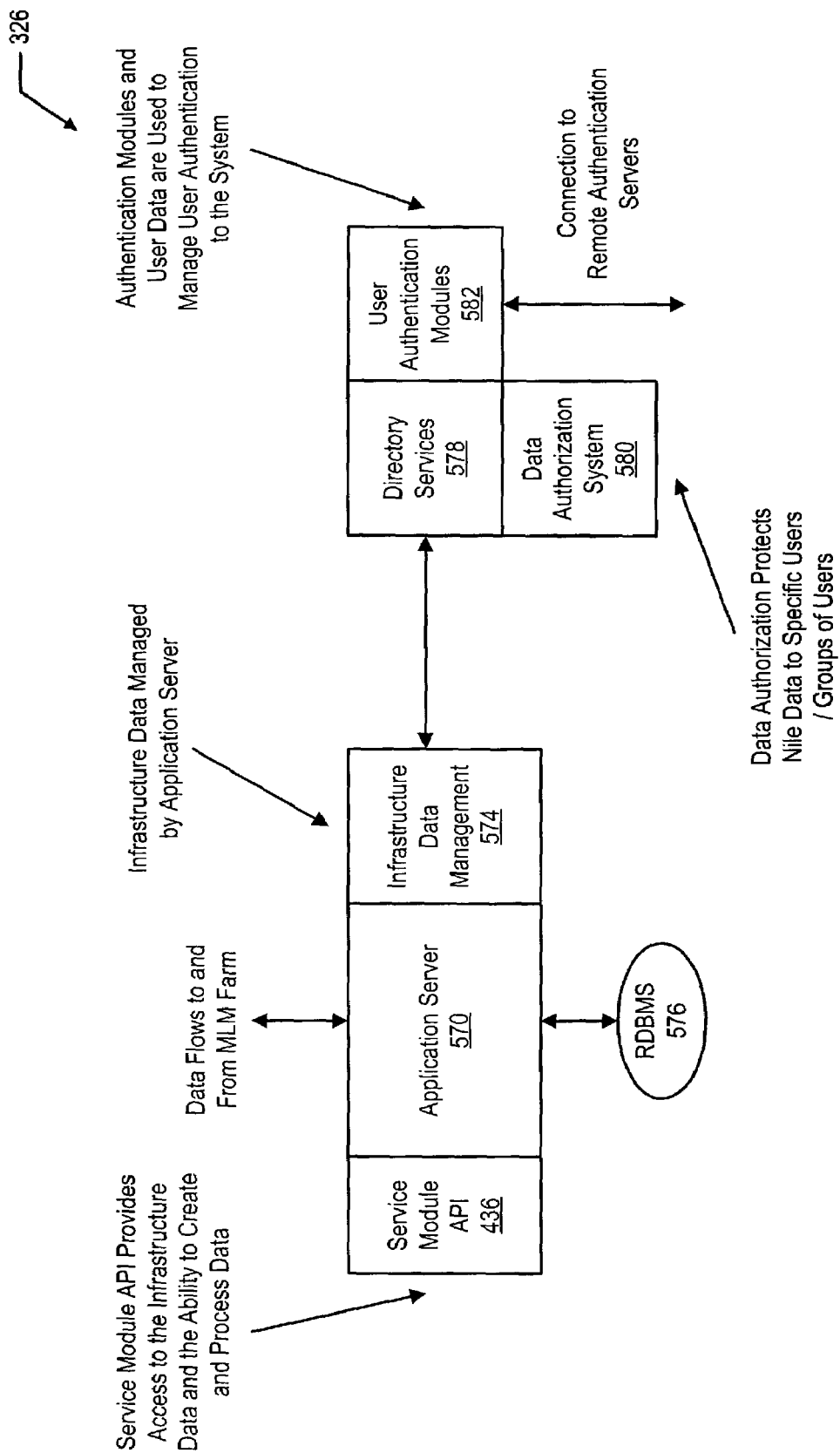
FIG. 9 shows a block diagram of an application server module.

Referring to FIG. 9, the application server 226 manages the persistence and data processing of the remote services infrastructure 102 and the service modules 103.

The application server 226 provides the core service module API 436 to the service module creator. The service module API 436 is based upon the J2EE API. The service module API 436 allows the service module creator to register for certain types of data as the data arrives and is instantiated. This data can then be processed using the support of the application server 226 or alternatively exported from the remote services system 100 for external processing.

The infrastructure data is held within the application server 226 and stored within the R17MS 576 associated with the application server 226. Access to this data is available via the service module API 436 and is managed via the infrastructure data management module 574.

The directory services implementation supports user authentication, data authorization and private network data support. User authentication uses a pluggable authentication module (PAM) so support a plurality of authentication methods such as a lightweight directory assistance protocol (LDAP) method for service provider employees and a local login method for a remote services based login schema. Other methods may be added. The LDAP login is processed using a replicated copy of an LDAP server running within the remote services infrastructure 102.

Data authorization is designed to protect the data held within the application server 226 to specific groups of users. This protection allows customers to grant or deny access to their service data to specific users. This data protection is managed down to the service module granularity. So for example, a customer could grant information about advanced monitoring on a subset of their support instances to members of a service provider monitoring staff.

Figure 10:
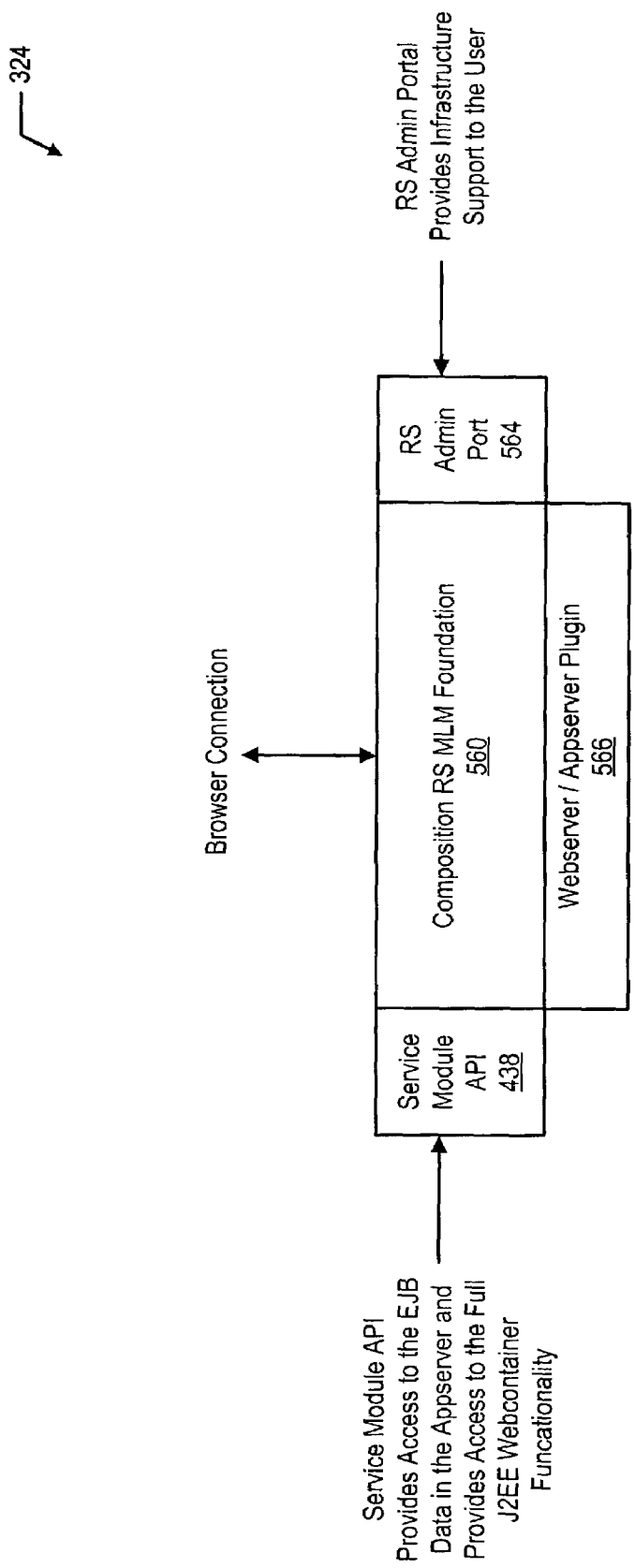
FIG. 10 shows a block diagram of a content generation MLM module.

Referring to FIG. 10, the remote services content generation MLM 224 provides HTML generation bases on the data held within the application server 226. The content generation MLM 224 provides a service module API 438 for service module creators to develop content composition for their data which is processed by the application server 226. The content is in the form of J2EE web container which supports Java servlets and Java servlet pages (JSP) API's.

The content generation MLM 224 communicates with the application server 226 using the same Netscape API (NSAPI) plug-in as the remote services applications MLM 218. Instances of these two MLMs make up an MLM farm. The composition remote services foundation layer provides support for caching of HTML pages and associated data to reduce the data request hit back to the application server 226.

The remote services administration portal 564 provides control of the deployed customer infrastructure to the customer and control over the total infrastructure to trusted users.

Figure 11:
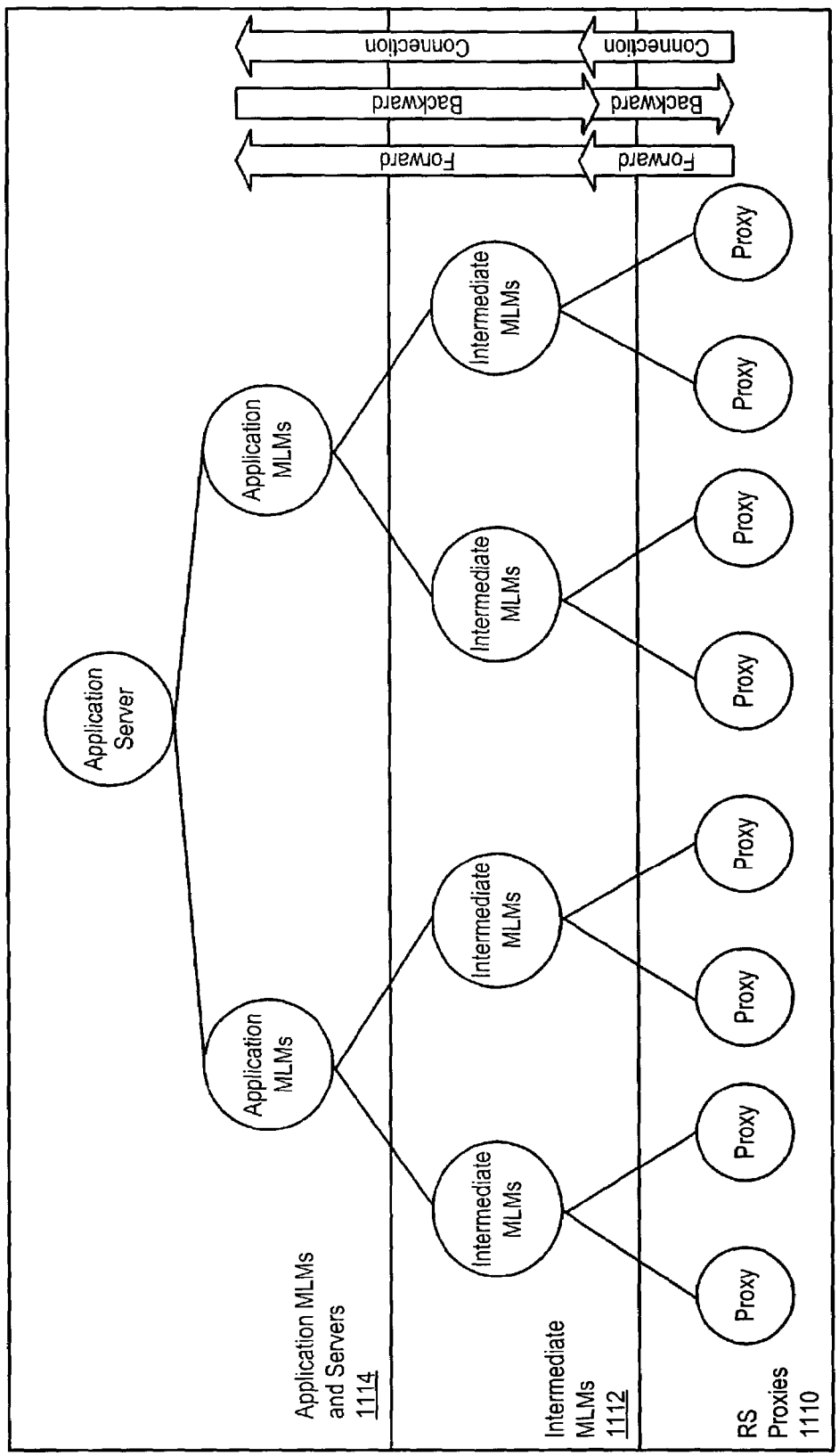
FIG. 11 shows a flow diagram of a remote services system communication.

FIG. 11 shows a flow diagram of communications within a remote services architecture. In one embodiment, the communications between a customer and a service provider is via a wide area network (WAN). Communications within the remote service architecture includes three tiers, a remote services proxy tier 1110, an intermediate MLM tier 1112 and an application MLM and server tier 1114. Communication is established and connections are made from the bottom tier (the remote services proxy tier) to the top tier.

The remote services architecture supports two application protocols for the majority of its services classification support: HTTP and Email messaging. There are a plurality of service module classifications that each have specific communications protocol relationships. More specifically, the service module classifications include a data collection classification, a monitoring classification, a remote access classification and an infrastructure administration classification.

With the data collection classification, the connection orientation is message based, the physical connection support may be Internet, private network or fax, and the protocols supported may be Email or HTTP. Examples of service modules of this classification include an inventory management service module and a performance management service module.

With the monitoring classification, the connection orientation is message based, the physical connection support may be Internet, private network or fax, and the protocols supported may be Email or HTTP. Examples of service modules of this classification include basic self service monitoring and full hardware monitoring with service action.

With the remote access classification, the connection orientation is session based, the physical connection support may be Internet, private network or fax, and the protocol supported is HTTP. The session based connection orientation is one way initiation from the customer. Examples of service modules of this classification include remote dial in analysis and remote core file analysis.

With the infrastructure administration classification, the connection orientation is session based or off-line installation, the physical connection support may be Internet, private network or fax, and the protocol supported includes HTTP, email or physical (e.g., telephone or CD). The session based connection orientation is one way initiation from the customer and the off-line installation is via, e.g., a CD. Examples of service modules of this classification include remote services administration, installation, updates, configuration and notification.

Encryption options are related to the protocol. A secure socket layer (SSL) protocol, for example, is likely to be the chosen protocol for an HTTP transmission, i.e., an HTTPS transmission. The remote services communication architecture does not enforce this however. So, for example, data could be sent by encrypting the body of an HTTP stream. This provides an advantage when a customer's HTTPS proxy infrastructure is not as resilient as their HTTP proxy infrastructure.

Email uses an email encryption option such as s-mime or encrypting the body using a third party encryption method such as PGP. Encryption is optional at all stages. If the customer does not require encryption, then encryption need not be used.

Authentication of the remote services communication is standard for all protocols. Accordingly, the service provider may validate the sender of data and the customer may validate that the service provider is the receiver. Authentication is managed via certificates.

Certificates are used in both the client and server to authenticate a communications session. Client certificates are generated during the customer registration process and are built into the remote services proxy and the customer MLM. By default, each customer is provided a client certificate. The customer can, however, define specific security groups within their service domain and request additional client certificates for those domains. Remote services processes include a certificate distribution mechanism, supporting either the creation of a new security group within an existing customer or the redeployment of a new certificate after a certificate is compromised.

Figure 12:
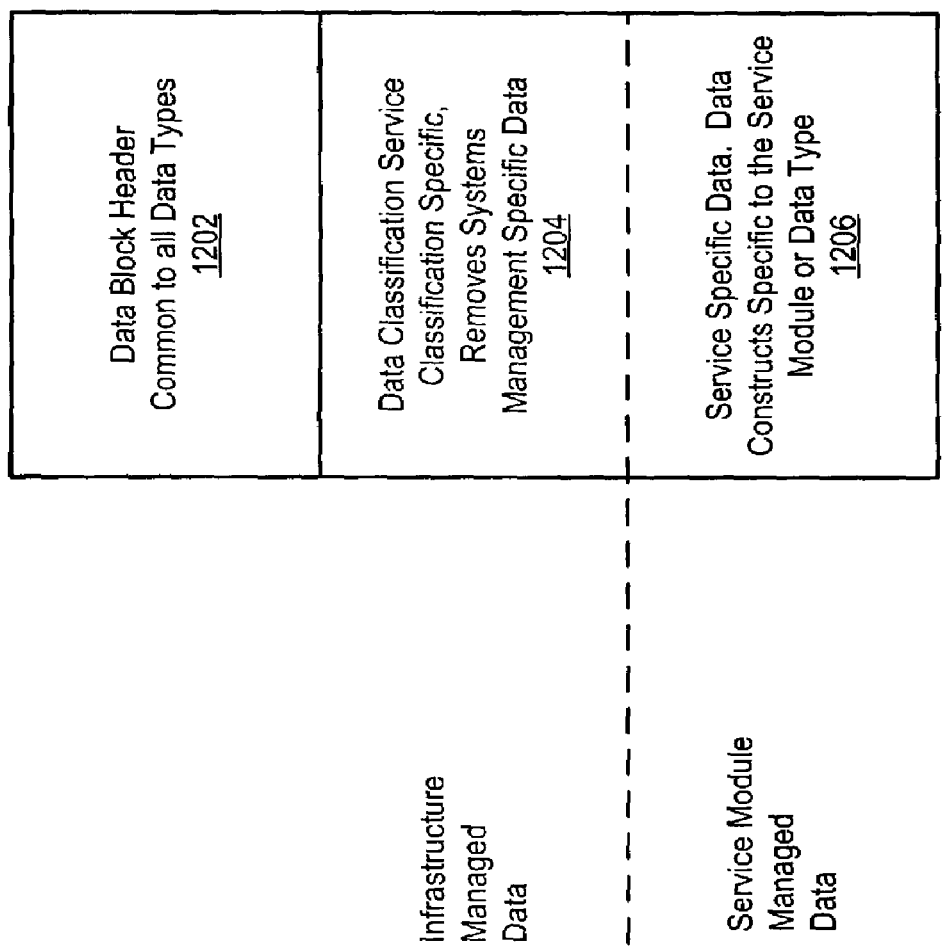
FIG. 12 shows a block diagram of the data blocks that comprise the data that flows through the remote services infrastructure.

FIG. 12 shows a block diagram of the data blocks that comprise the data that flows through the remote services infrastructure. Each system management system conforms to the data definitions that are part of the remote services proxy integrators API 430. The remote services communications architecture provides a normalized view of the data, regardless of in which systems management framework the data originated.

Data block header 1202 is common to all data types. Data block header 1202 contains items such as source, routing information, time to transmit and source type. Data block header 1202 is used to route the data correctly through the remote services system 100 to the correct service module 103. Data block header 1202 is used to provide diagnostic and quality of service measurement built into the system.

Infrastructure data block 1204 provides data classification service classification specific data. Infrastructure data block 1204 removes systems management specific data.

Service module data block 1206 provides format based on each service classification that drives the system the systems management normalization of the data that flows through the system. For example, alarm data includes general characteristics defined such as severity, state and originating support instance.

Figure 13A:
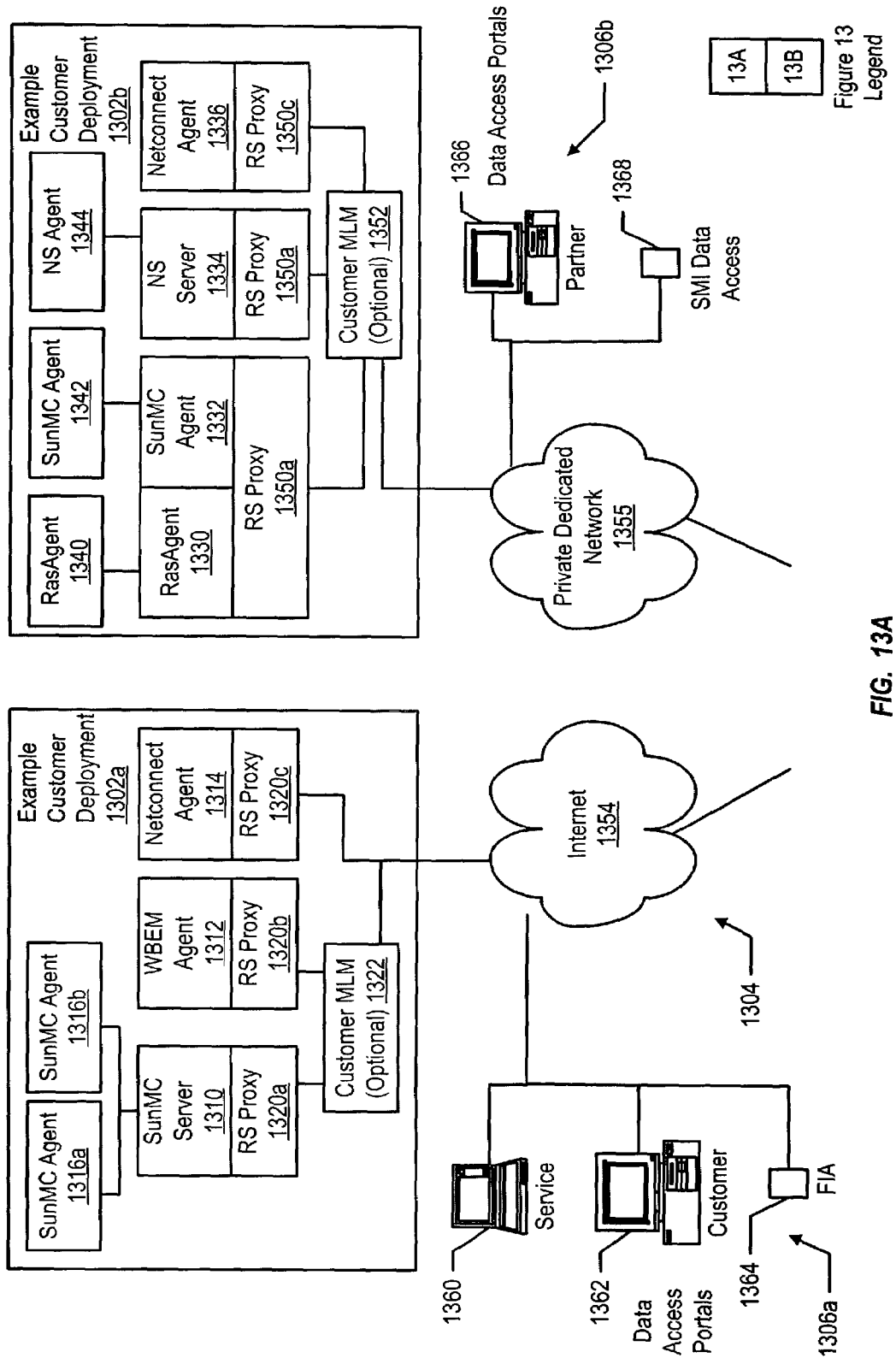
FIGS. 13A and 13B show an example of the high level architecture component relationships of a remote services system that is configured according to the remote services architecture.
Figure 13B:
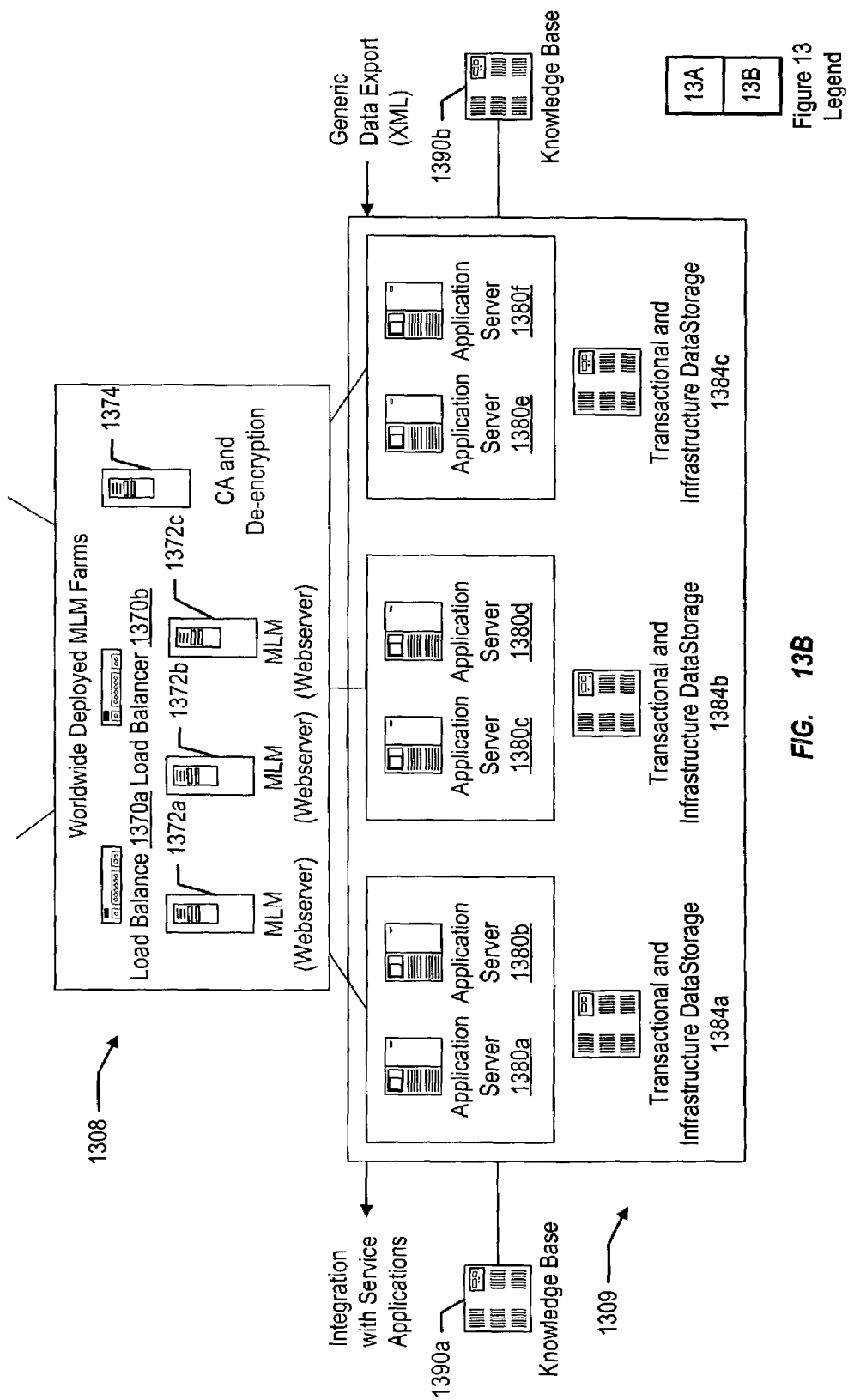

FIGS. 13A and 13B show an example of the component relationships of a remote services system 100 that is configured according to the remote services architecture. Various components of the remote services system 100 execute modules of the remote services infrastructure architecture 205. Remote services system 100 includes customer deployment portion 1302a, 1302b, network portion 1304, data access portal 1306a, 1306b, Mid Level Manager (MLM) portion 1308, and application server portion 309.

Customer deployment portion 1302a sets forth an example customer deployment. More specifically, customer deployment portion 1302a includes SunMC server 1310, WBEM agent 1312, and Netconnect Agent 1314. SunMC agents 1316a, 1316b are coupled to SunMC server 1310. Server 1310, Agent 1312 and Agent 1314 are each coupled to a respective remote services proxy 1320a, 1320b, 1320c. Remote services proxies 1320a, 1320b, 1320c are coupled to network portion 1304, either directly, as shown with proxy 1320c, or via customer MLM 1322, as shown with proxies 1320a and 1320b. Proxies 1320a and 1320b may also be directly coupled to network portion 304 without the MLM 1322 present. The SunMC server is a provider specific systems management server (i.e., health management server). The SunMC agents are provider specific systems management agents (i.e., health management agents). The WEBM agent is a web based enterprise management agent. The Netconnect agent is a basic collection agent. Customer deployment portion 1302a illustrates that the systems management may be 2-tier (e.g., agent, console) or 3-tier (e.g., agent, server, console).

Customer deployment portion 1302b sets forth another example customer deployment. More specifically, customer deployment portion 1302b includes RasAgent 1330, SunMC agent 1332, NS server 1334 and Netconnect Agent 1336. RasAgent 1340 is coupled to RasAgent 1330. SunMC Agent 1342 is coupled to SunMC Agent 1332. NSAgent 1344 is coupled to Netconnect Agent 1336. RasAgent 1330 and SunMC Agent 1332 are coupled to remote services proxy 1350a. Metropolis Server 1334 is coupled to remote service proxy 1350b. Netconnect Agent 1336 is coupled to remote services proxy 1350c. Remote services proxies 1350a, 1350b, 1350c are coupled to network portion 1304 either via customer MLM 1352 or directly. The RasAgent is a reliability, availability, serviceability agent. The NSagent is a network storage agent and the NS server is a network storage server. Both the NSagent and the NS server are reliability, availability, serviceability type devices.

Network portion 1304 includes at least one interconnection network such as the Internet 1354 and/or a private dedicated network 1355. Internet 1354 is assumed to be an existing connection that is reused by the remote services system. The private dedicated network 1355 is a dedicated link that is used exclusively by the remote services system to connect the customer to the service provider. The data to manage the private network is provided by directory services technology held within the application server portion 1308. The directory services technology handles all of the domain name service (DNS) services used to manage name to allocated internet protocol (IP) information. The remote services infrastructure also offers transmission over fax from the customer's environment (not shown). The fax communication is for service modules where the fax transmission makes sense. For example, fax transmission may be used in a military site which does not allow electronic information to be transmitted from it.

Data access portal portions 1306a and 1306b provide access to the remote services system 100. More specifically, data access portal portion 1306a includes a service access portion 1360, a customer access portion 1362 and a field information appliance (FIA) 1364. Data access portal portion 1306b includes a partner access portion 1366 and a system management interface (SMI) data access portion 1368.

Mid level manager portion 1308 includes load balancers 1370a, 1370b, MLM webservers 1372a, 1372b, 1372c and communication authentication (CA) and de-encryption server 1374.

Application server portion 1309 includes a plurality of application servers 1380a–1380f. Application servers 1380a, 1380b are associated with transactional and infrastructure data storage 1384a. Application servers 1380c, 1380d are associated with transactional and infrastructure data storage 1384b. Application servers 1380e, 1380f are associated with transactional and infrastructure data storage 1384c. Application server portion 1309 also includes knowledge base 1390a, 1390b. Application server portion 1309 integrates with service applications as well as via generic data export (such as, e.g., XML).

Remote services proxies 1320, 1350 provide a System Management Integrators API. Using this API, system management products can integrate their customized handling of data into the common data format that is used by the remote services architecture. Accordingly, the system management component of the overall system is effectively segmented away from the remote services architecture.

Additionally, by using the remote services proxies 1320, 1350, the remote services architecture leverages much of a pre-existing instrumentation and data collection mechanisms that already exist. Accordingly, already deployed instrumentation agents within a remote service provider existing system such as those from SunMC and Netconnect may be integrated into a remote services system. Additionally, third party systems management systems may also be supported and integrated via the remote services proxies.

Customer deployment portions 1302a, 1302b each show an optional customer MLM component deployed to the customers environment. Whether to deploy the customer MLM component depends on a number of factors. More specifically, one factor is the number of support instances installed in the customer's environment and the number of services being utilized by the customer. A deployed MLM component can allow greater scale capabilities. Another factor is the type of services deployed within the customer environment. Some services are optimized when an MLM component is deployed to the customer environment to support service specific tasks such as filtering and data aggregation. Another factor is the quality of service. Deploying an MLM component provides a greater level of quality of service because the MLM component provides enhanced data communications technology within the MLM infrastructure modules.

The decision of whether to deploy a remote services MLM component (or more) to the customer's environment is a deployment decision. There are a number of architecture deployment classes which are used to meet the varying customer needs.

The remote services system communicates via two main protocols, HTTP and email. Security considerations for these protocols can be chosen by the customer and plugged into the system. For example, the HTTP protocol may use SSL. Additionally, the email protocol may use some well known form of encryption.

The connections from the customer deployment portion 1302 feed into MLM farms which reside within the SMI service provide environment. These MLM farms are sets of redundant web servers 1372 that are balanced using conventional load balancing technologies. Alongside these web servers 1372 are infrastructure servers 1374 which provide specific infrastructure acceleration for decryption and distribution of certificates for communications authentication.

These MLM farms provide a plurality of functions. The MLM server farms provide remote proxy connections. In deployments when an MLM is not deployed to the customer, the customer's proxy connects to the MLM farms within MLM portion 1308. Also, in deployments when a customer MLM 1322, 1372 is present, the MLM farm communicates and manages communication with the deployed customer MLM 1322, 1372. Also, the MLM server farms provide data processing capabilities, e.g., the MLM farms provide application specific tasks to prepare data for passing to the remote services application server portion 1309. Also, the MLM server farms provide access points for the customer and service personnel via browser like connections. The MLM farm generates the HTML that is presented to the browser.

The MLM technology is based upon known web server technology such as that available from Sun Microsystems under the trade designation iPlanet. Plug-in functionality is provided by the servlet and JSP interfaces available as part of the web server technology.

The remote services application servers 1380 provide data processing and storage for the remote services infrastructure as well as for any hosted service modules. The remote services application servers 1380 are based upon known application server technology such as that available from Sun Microsystems under the trade designation iPlanet application server 6.0. The remote services application server 1380 provides support for horizontal scalability, redundancy and load balancing. Thus providing the back-end components of the remote services architecture with a high level of built in assurance and flexibility. Application partitioning of the application servers 1380 provides processing distribution to ensure that heavy processing that may be required by more complex services are handled appropriately without affecting the remainder of the remote services architecture.

Application server portion 1309 provides integration into existing business systems, generic data export and tight integration with existing knowledge base implementations 1390. Data export is handled through structured XML, data can be exported asynchronously by a client registering to receive data of a particular type or synchronously by the application server 1380 accepting a request from a client.

The core service module API is provided by the application server 1380 using a J2EE implement API. The basic container services of J2EE are extended to provide remote services specific functions and to create the basis of the API. Accordingly, a service module creator can rely on a number of provided for services, such as database persistency, high levels of atomic, consistent, isolated, and durable (ACID) properties, directory service access, authorization protection for the data and access to the data collected by the remote services infrastructure itself.

The creation of a service module, which provides the technology to support a specific remote service, involves at least one of the following components: a creation of detection/collection logic component; a mid-stream analysis and management of data component; an analysis and storage of data component; and, a presentation and management of the data/knowledge component.

The detection/collection logic is created within the domain of a systems management toolkit. The mid-stream analysis and management of data is an optional step and effectively provides analysis of the data within the customer's environment. Inclusion of this logic would mean that the mid-stream analysis and management of data service module would have a remote services MLM deployed to the customer's environment 1302a, 1302b. The deployment of the remote services MLM to the customer's environment reduces and manages the data being sent over the WAN to the remote services provider. The analysis and storage of data component is performed within the application servers domain (the component may be exported). This analysis and storage of data component turns data into knowledge and service value that can then be presented back to the customer. The presentation and management of the data/knowledge component is where the data and knowledge that is developed from the analysis and storage of data component is presented to the customer or service personnel. The presentation and management of data/knowledge component may include interactive support to provide modification of the data values.

The remote services system 100 comprises communication components that are adaptive and allow the customer or the system to optimize the use of network resources. For example, the system can be configured to control the network use, bandwidth and number of simultaneous connections, to accommodate the customer's infrastructure while meeting his performance expectations. Furthermore, the system can be configured to use the existing resources efficiently, to enhance remote services system 100 performance and response time. Finally, the system can be configured to provide data prioritization, to ensure that urgent data (e.g., alerts) is delivered in a timely manner, even when an outgoing bulk-data transmission is occurring.

To understand network usage of the remote services system 100, it is important to understand the data type and type of transmission that the remote system uses. Data transferred on the system can be classified into two types: Short messages and Bulk Data. Short messages can be transmitted quickly when the connection is established. Bulk data transfer, on another hand, can require the connection to stay open for a significant time, while the data is transferred. Short messages can be either "urgent" or "normal" messages. Short messages and bulk data can be prioritized according to the following hierarchy: 1) Urgent messages should be dispatched as soon as is feasible; 2) Normal messages should be dispatched after all urgent messages have been dispatched; 3) Bulk messages should be dispatched after all normal and urgent messages.

The system uses a different channel (Web server or HTTP Proxy) for short messages versus bulk data transfer. While the use of the HTTP proxy channel is controlled by an authorization mechanism using short messages, the short messages themselves are controlled by a throttle mechanism described in greater detail below. These two channels are parallel and independent from a network perspective. In addition to the channels discussed above, an HTTP(s) "tunnel" connection can be established to provide data segmentation within the system on a per-customer basis to allow customer data to be directed to a dedicated servlet.

When an aggregation MLM is serving as the intermediate MLM, email protocol may be used for communication between the proxy and the intermediate (aggregation) MLM. In this mode, the incoming messages are converted from email to HTTP for communicating further downstream. This conversion is one of the features that enables bandwidth management by the intermediate MLM.

Figure 14:
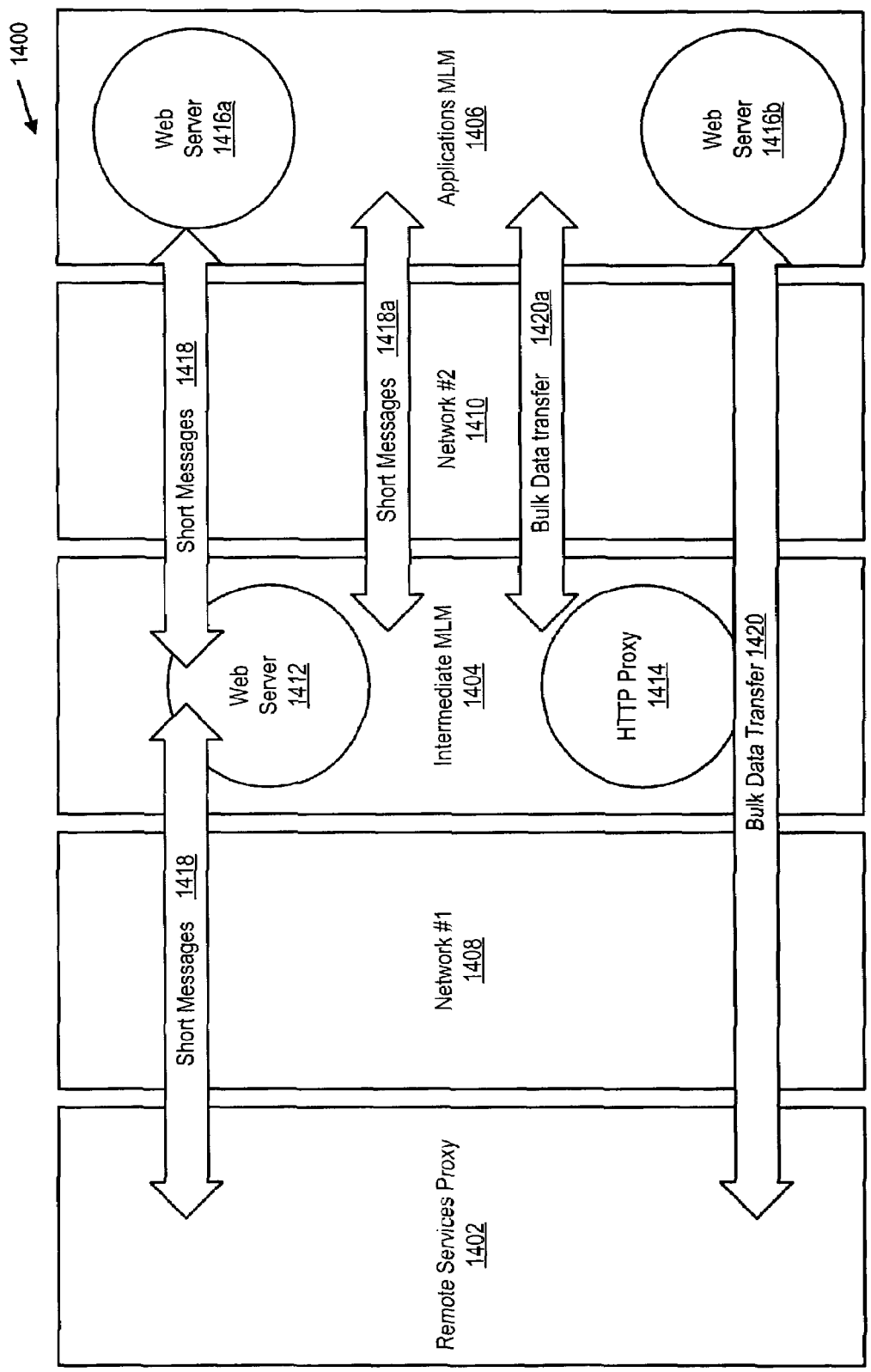
FIG. 14 is a general illustration of the remote services infrastructure illustrating data flow between the components of the remote services system.

A general illustration of the remote services system infrastructure 1400 can be seen in FIG. 14. The infrastructure comprises a proxy 1402, an intermediate MLM 1404 and an application MLM 1406. The proxy 1402 and the intermediate MLM 1404 are linked by a first network 1408, while the intermediate MLM 1404 and the application MLM 1406 are linked by a second network 1410. The intermediate MLM comprises a web server 1412 and an HTTP proxy 1414. The application MLM comprises web servers 1416*a* and 1416*b*. Short messages are transmitted through the network via web server 1412 on the intermediate MLM 1404 and web server 1416*a* on the application MLM 1406. Bulk messages 1420 are transmitted through the network via the HTTP proxy 1414 on the intermediate MLM 1404 and the web server 1416*b* on the application MLM 1406.

Note the small arrows 1418*a* and 1420*a* between the intermediate MLM 1404 and the Application MLM 1406. These arrows represent existing traffic such as short messages 1418*a* originated on the intermediate MLM 1404 or software upgrade bulk data transfer 1420*a* for the intermediate MLM 1404. These represent a small, but potentially important, part of the overall network traffic.

All types of deployments rely on a three-tier architecture with external system management reaching the system through a proxy. Data goes through an intermediate MLM 1404 to reach the remote services system 100 Application MLM 1406.

Depending on the specific architecture deployed, the location of these tiers and the network type linking them may vary. In one embodiment of a deployment, the intermediate MLM 1404 is located at the remote service system data center, the network #1 is a combination of the customer network and the Internet, and the network #2 is the internal LAN of the remote service system data center. An alternate deployment may locate the intermediate MLM 1404 at the remote service system data center and use a private link as Network #2.

Also, additional equipment may be found on the customer network such as firewalls and routers performing NAT or HTTP proxies. This equipment may change the view the receiver has of the sender from a network perspective. For example, at the IP layer, the addresses of a single sender may be seen as multiple addresses (use of a farm of HTTP proxy, or dynamic NAT) or multiple senders may be seen as the same IP address (one HTTP proxy or firewall). These changes of the network layer view may impact the behavior of certain solutions described herein.

Issues related to control of network usage can be separated into two categories: bandwidth control and control over the number of (simultaneous) connections. While bandwidth can be rapidly consumed by bulk data transfer, short messages may generate a large number of connections that can cause allocation problems.

As shown in FIG. 14, most of the network traffic is generated on the remote service system proxy 1402, where the component installed is limited to a "lightweight" software package. While controlling the number of network connections is easily accomplished at the application level (since it is the application that decides to establish a new connection), controlling the bandwidth used by an open connection is much more complex, especially when the application expects to use a standard HTTP library to stay at the application protocol level.

Based on system prioritization, it is important to be sure that short messages with high priority are delivered before low priority messages. In the remote services system 100, on the short message sender (mainly the proxy 1402), all short messages are first queued. The system then processes all queues to rank which messages are the most urgent and then sends the message according to the relative priority associated with their respective rank. The system application is responsible for prioritizing the establishment of the connection used to send short messages. However, it relies on the ability of the remote services system 100 to be able to open a network connection and transfer the message on that connection once the message is chosen.

As was discussed above, transmission of urgent short messages may be needed when an existing bulk data transfer is under way, consuming most of the network resources. It is essential, therefore, that the system infrastructure provide a process for ensuring that such short messages are able to get through. Depending on the specific type of deployment, this goal may be compromised because the remote services system 100 may not control all network components on the data path. The system can only ensure that all network resources available for the system are allocated to the urgent data; but the system cannot ensure that all network resources are available.

In the remote services system 100, most of the network traffic has a system proxy 1402 as source or final destination. The proxy 1402 is a software component installed on a customer host, which is "lightweight," native and exists for all supported OS. It is a high-level software component, acting as a system entry point, using a standardized library to provide network access at the application protocol layer.

Figure 15:
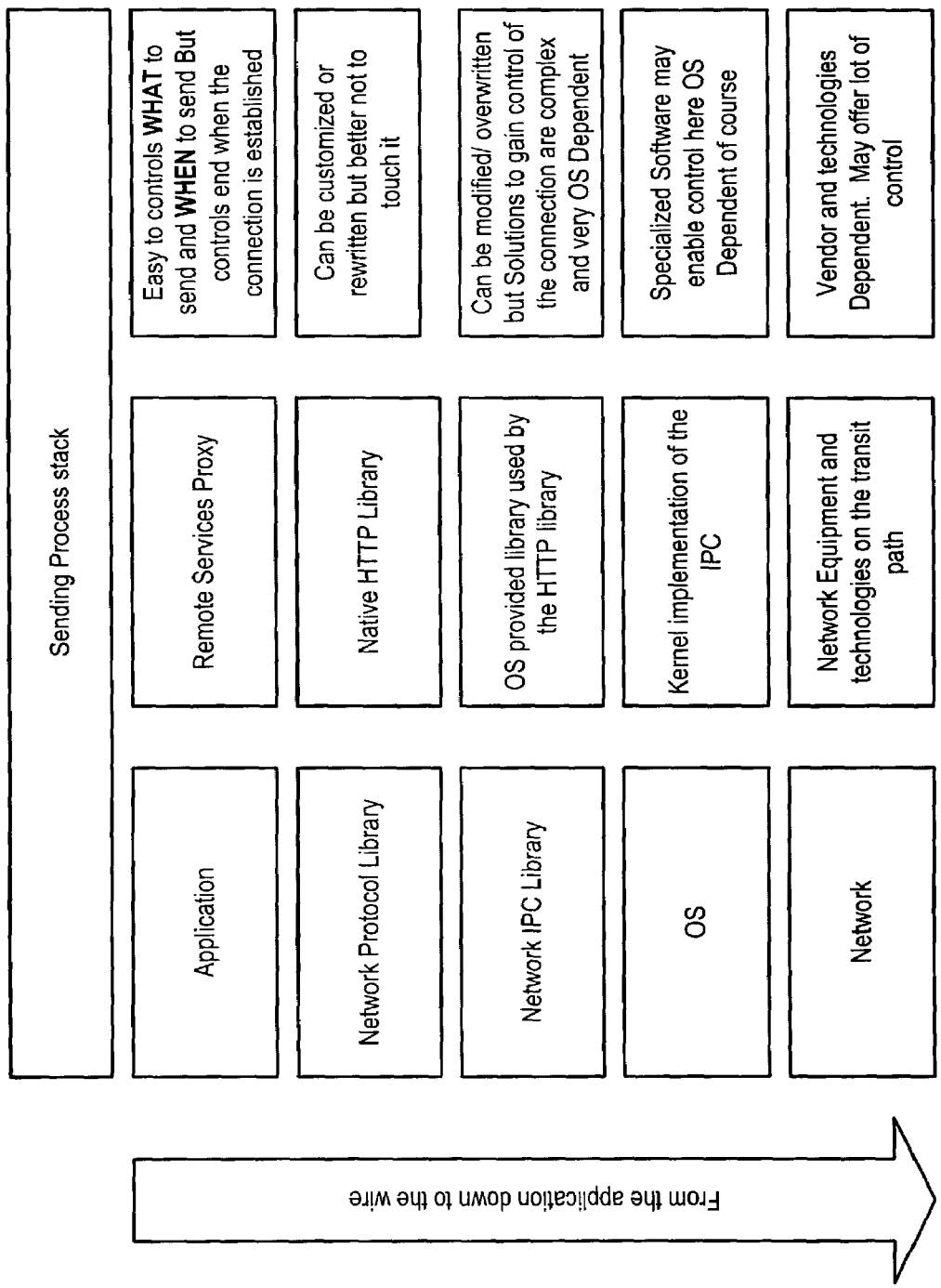
FIG. 15 is an illustration of the stack used by system proxy 1402 to exchange data through the network and to control or change behavior of system components at each level.

FIG. 15 is an illustration of the stack used by system proxy 1402 to exchange data through the network and to control or change behavior of system components at each level. FIG. 15 shows that the system software component is a high level software module, based on a standard library, supported over various OS and compatible with most customer configurations. Also, since it is installed by the customer on an existing system, it must be simple and should not disrupt the function of the host or any custom software the customer may have installed on it.

Communication control is easily facilitated at the application layer using the system's throttle control, queuing and data prioritization. The throttle control also involves other system infrastructure on the network path, since these components can reject a connection request due to their throttle limit.

Solutions may be built around multiple levels of this stack. For example, the Network protocol library can be modified to provide control to a system application through a new API, allowing the system to suspend an existing transfer and resume it. It is generally simpler to implement a solution at the upper level of the stack. However, some control features require implementation at lower levels of the stack. For example, control of the current bandwidth used by the system can only be occur at the OS level. Neither the protocol library nor the application can offer effective control of the dynamic bandwidth used.

As shown in FIG. 14, two main components involved in MLMs are the Web Server engine and the HTTP proxy. The remote services system 100 software is built on top of the web server engine, while the HTTP proxy engine provides a fast-track to transfer bulk data through the MLM. The intermediate MLM 1404 primarily acts as a relay to accept and forward data (after some processing, if needed) while the service provider Applications MLMs 1406 are the final destination, being the bridge to the Application servers.

MLMs are appropriate points in the remote systems 100 architecture to implement control features to provide better control of data prioritization and real-time bandwidth management. Intermediate MLMs 1404 serve as the aggregation point and Applications MLMs 1406 serve as the final destination. In each of the possible types of deployment, one of these MLMs is controlled by the service provider and located on the service provider's network.

The remote services system 100 proxy Daemon provides a mechanism for the persistent queuing of messages. This is to ensure that in the event of a temporary network outage, or the failure of a local or remote MLM, vital data will not be lost. The queue of messages is managed according to the Time-To-Live (TTL), precedence and persistence attributes specified in the quality-of-service (qos) parameters in API calls by the Integration Modules. Higher precedence messages are inserted toward the front of the queue and lower precedence messages toward or at the end of the queue. A new message with the same precedence as a previously queued message is guaranteed to be queued behind the earlier message. This ensures correct delivery order for messages such as events, which might be important for correlation or aggregation purposes in the MLM. Details relating to the implementation of queuing will be discussed in greater detail below in connection with the process flow charts describing the handling of messages in the remote services system 100.

In addition to queuing control, the remote services system 100 Proxy Daemon will support data throttle. This is facilitated using the queuing mechanism. The throttle control is able to be configured in the following ways: 1) Max. # of bytes per time-period (e.g. hour/day); 2) Max. # of bytes per message; 3) Max. # of messages per time-period; and 4) Times during which messages can be sent (e.g. 8 pm to 8 am). Additionally, the throttle control will provide a manual start-stop interface to allow System administration control over when data can be sent. Any or all throttle parameters can be set to "unlimited," which is the default configuration.

The throttle control can also be used to control transfer authorization. More specifically, the remote services system 100 can limit network connections based on either static data (e.g., time of the day) or dynamically calculated parameters (e.g., total bytes sent, messages sent). For a Customer MLM that is part of a Customer MLM Farm, these dynamic parameters need to be shared to reflect the total network usage. The throttle module bases its decision to accept or reject a connection based on this shared data and other local data such as disk space available. Details relating to the implementation of the throttling function will be discussed in greater detail below in connection with the process flow charts describing the handling of messages in the remote services system 100.

To connect to the remote services system, any component located on the customer network will use a specific URL. The URL is composed of two parts: 1) a generic part, e.g., http(s)://nile.sun.com and 2) a specific part, dependent on each customer, and related (as a hash function of the CN) to the customer certificate in use. This second component is appended to the generic URL. An example of a customer-specific URL is http(s)://nile.sun.com/BANDWIDTH ID, where BANDWIDTH ID identifies a customer group of the remote services system component and is defined as an object through the remote services system portal. Thus the bandwidth management system can efficiently group incoming connections by customer and control them.

While the above discussed structure provides bandwidth control per customer, data prioritization can also be accomplished via URL redirection. For example, the "URGENT," "NORMAL" and "BULK" tokens can be appended to a URL to implement URL redirection for data prioritization. Thus the final URL used for data prioritization will be in the form of http(s)://nile.sun.com/BANDWIDTH ID/TYPE OF DATA.

Rewriting of the URL is performed by the first web server reached in the remote services data center. The first server will be an Aggregation MLM for configuration type A, described hereinabove, or an Application server for configuration type B or higher.

Figure 16:
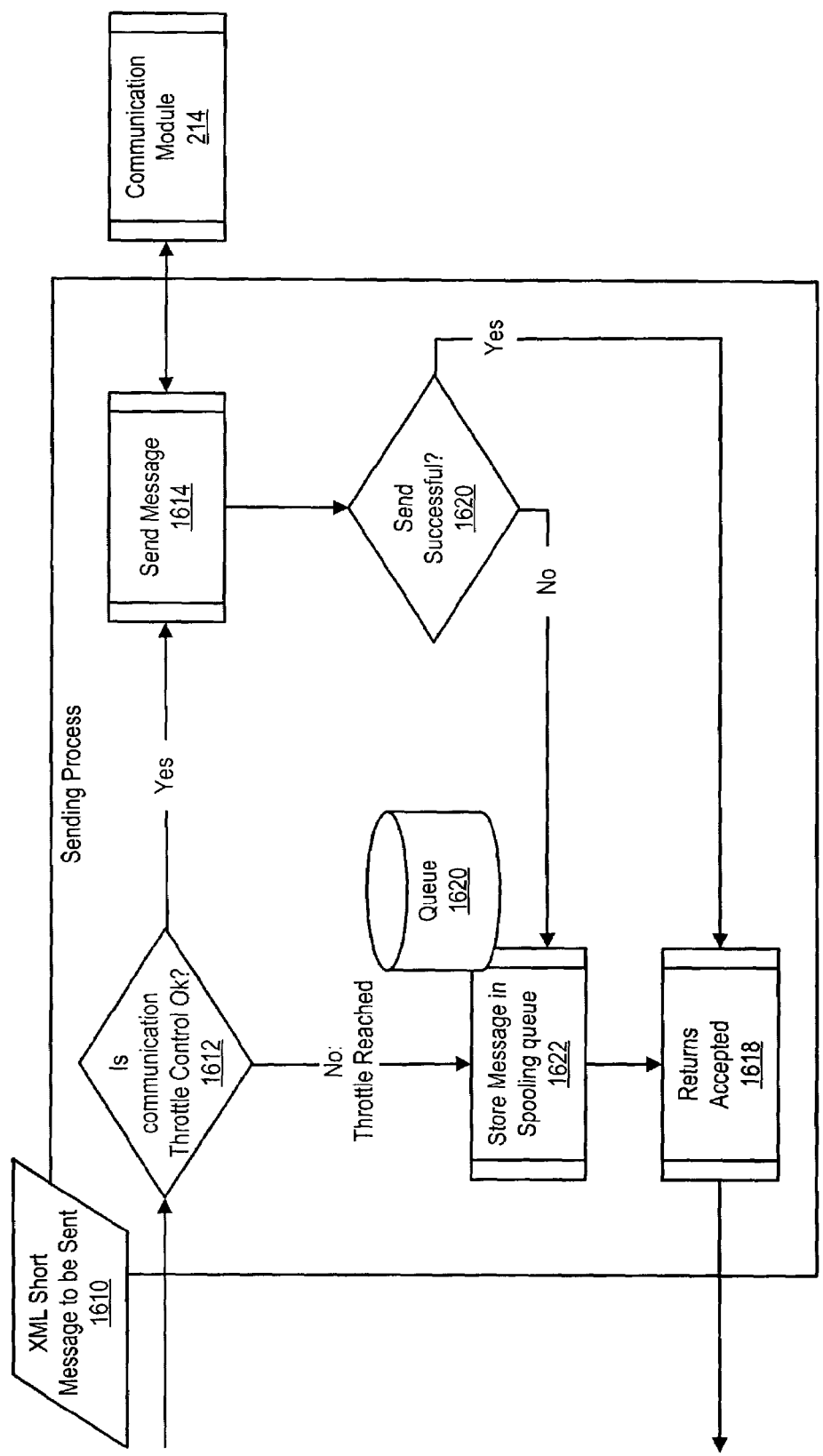
FIG. 16 shows a flow chart of the different tasks associated with the sender of a message.
Figure 17:
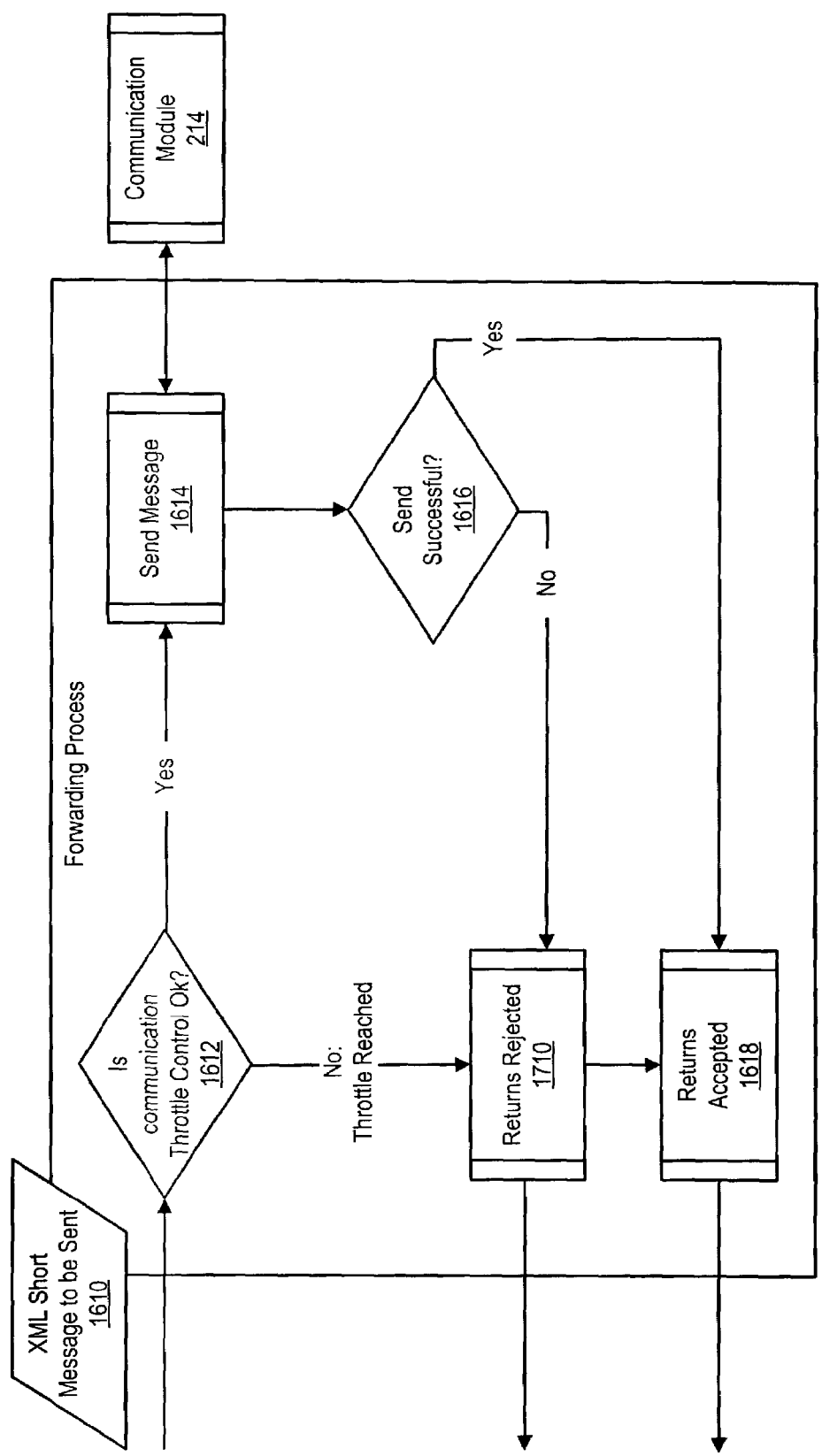
FIG. 17 shows a flow chart of the different tasks associated with a component forwarding a message.

FIGS. 16 through 25B provide flowchart illustrations of the flow of messages and bulk data in the remote services system 100. FIG. 16 shows a flow chart of the different tasks associated with the sender of a message. FIG. 17 shows a flow chart for a component forwarding a message. More specifically, when a short message is sent at step 1610, the message is first checked to determine whether the communication throttle control is okay at step 1612. If the throttle control is okay, then the message is sent at send message step 1614 to communication module 214. The sent message is then analyzed to determine whether the send was successful at step 1616. If the send was successful, then the returns accepted message is generated at step 1618.

For the sender of a message, if the throttle control is not okay, i.e., the throttle has been reached, then the message is stored in spooling queue 1620 at step 1622. A returns accepted message is then generated at step 1618. The queue 1620 queues messages ready to be sent waiting for the communication channel to be available. No processing is done on these messages. The queue ensures that each message is delivered to its destination. Because the message is always either transmitted or spooled, the sender never returns a rejected code. It is up to the process managing the queue to return a rejected code whenever a queued message is pruned out.

With a component forwarding a message if the throttle has been reached, the message is not stored within a queue, but is returned to the sender at returns rejected step 1710.

Figure 18A:
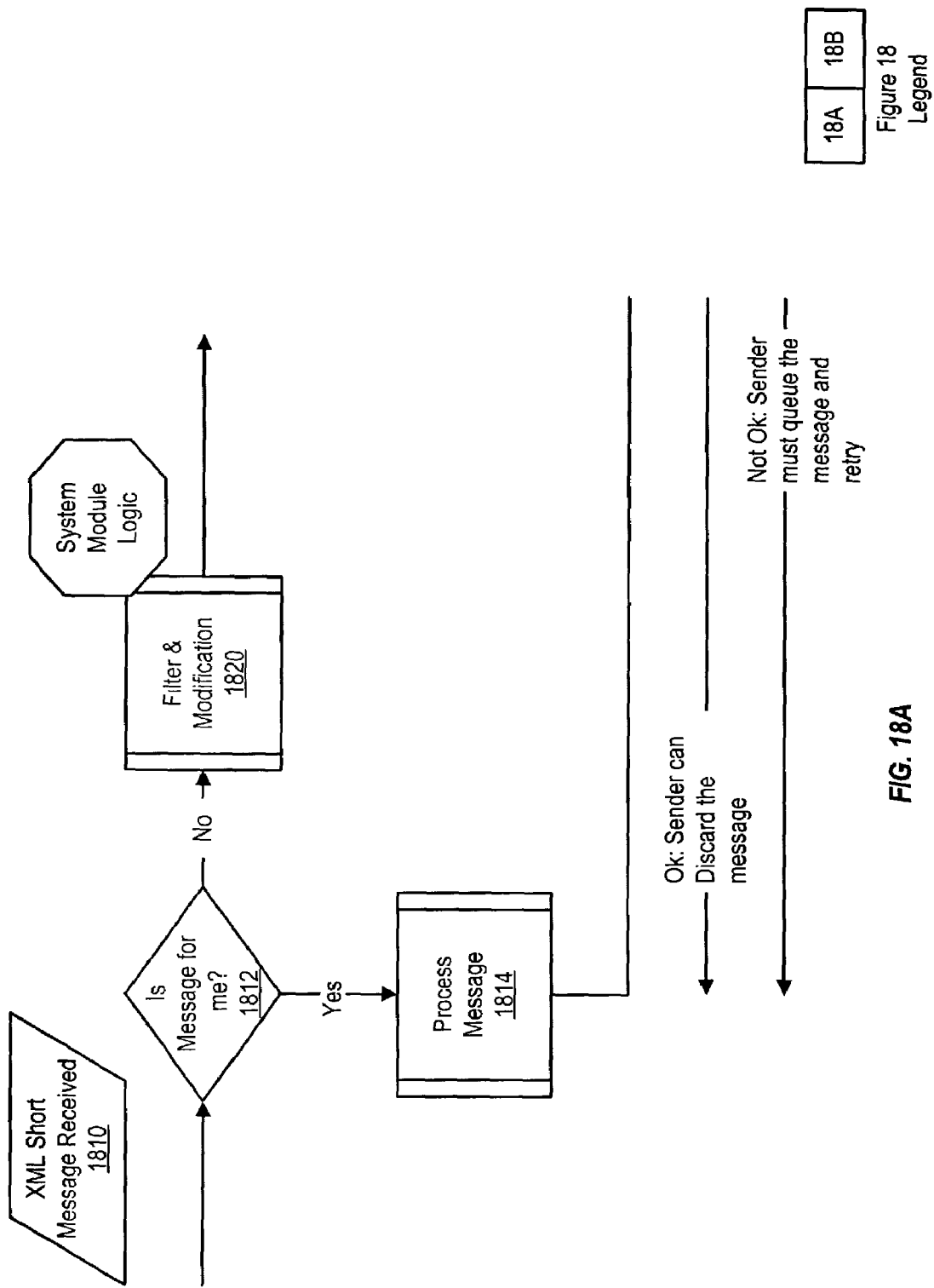
FIG. 18 shows a flow chart of an overview of the data flow of the intermediate receiver of a message.
Figure 18B:
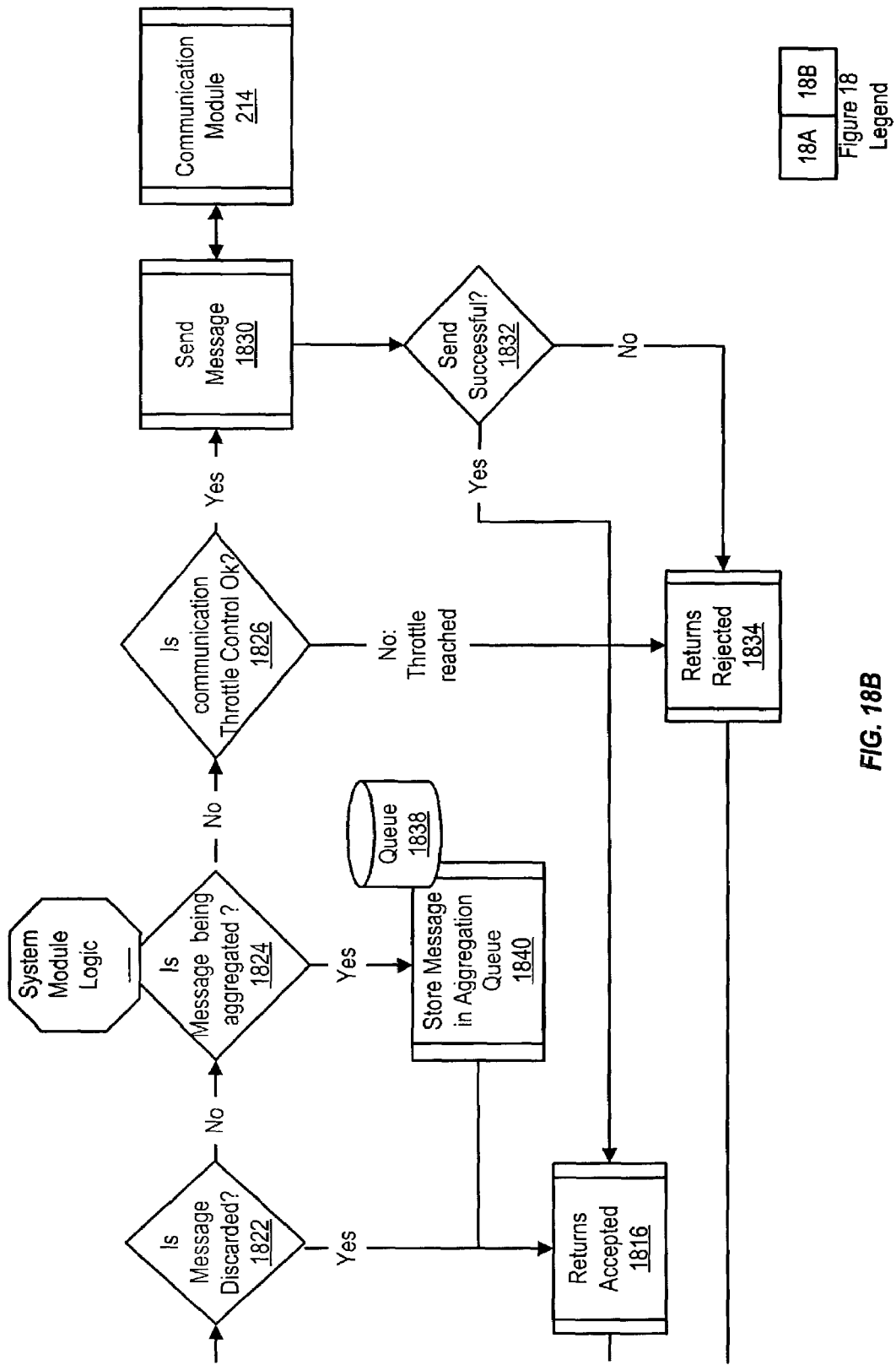

Referring to FIG. 18, a flow chart of the overview of the intermediate receiver is shown. The path from a sender to the final destination involves the intermediate MLM 216, be it a customer MLM or an aggregation MLM. When the message is received at step 1810, the intermediate MLM 216 determines whether the intermediate MLM 216 is the intended recipient of the message at step 1812. If yes, then the message is processed at step 1814 and a returns accepted message is generated at step 1816, thus indicating to the sender that the stored message can be discarded.

If the MLM is not the intended recipient, then the MLM then performs a filter and modification function at step 1820 using the system module logic of the MLM. The message is then reviewed to determine whether the message is to be discarded as a result of the filtering at step 1822. If the message is to be discarded then a returns accepted message is generated at step 1816. If the message is not discarded then the MLM then determines whether the message is to be aggregated at step 1824.

If the message is not to be aggregated, then the communication channel is reviewed at step 1826 to determine whether the throttle control is okay. If so, then the message is sent at send message step 1830 via communication module 214. The message is also analyzed to determine whether the send was successful at step 1832. If the send was successful, then the returns accepted message is generated at step 1816. If the send was not successful, then a returns rejected message is generated at step 1834. The returns rejected message indicates that the sender should queue the message again and retry sending the message.

If the message is to be aggregated, then the message is stored in the MLM aggregation queue 1838 at step 1840. The result of the aggregating is a new message created from the queued messages. To send this new message, the MLM is acting as a sender and thus follows the process described above. The message is then recycled through step 1822 when the message is being aggregated. If the throttle control is not okay, then a returns rejected message is generated by step 1834.

Figure 19:
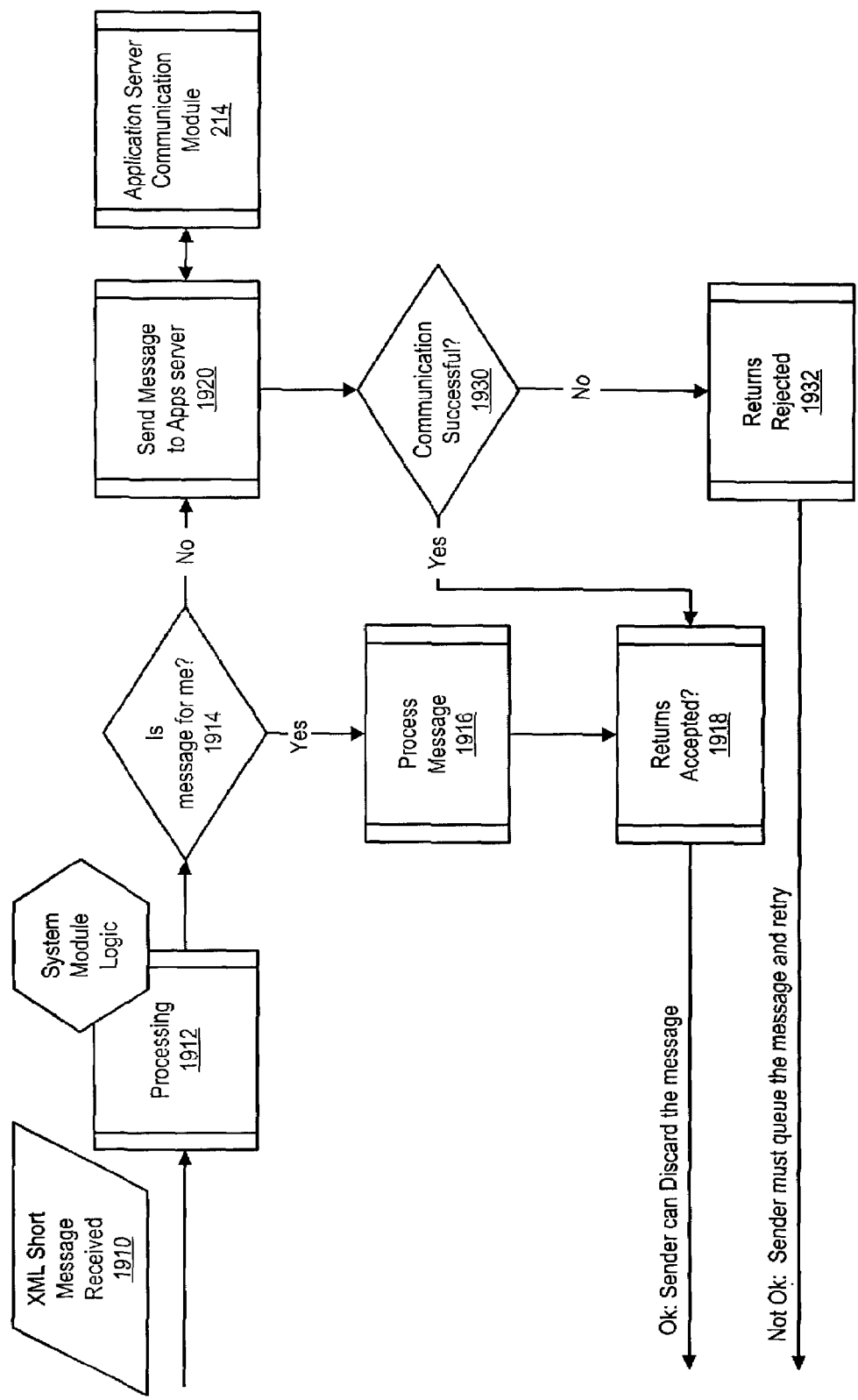
FIG. 19 shows a flow chart of the data flow of receiving a message.

FIG. 19 shows a flow chart of the data flow of receiving a message. The applications MLM 218 is an example of a module that only receives messages. Because no aggregating or filtering is done, the data flow is simpler than that of an intermediate MLM. The communication is synchronous and does not involve any queue mechanism.

More specifically, the message is received at step 1910. Initial processing is performed at step 1912 using the system module logic of the receiver. The message is then reviewed to determine whether the receiver is the intended recipient at step 1914. If so, then the message is processed at step 1916 and a returns accepted message is generated at step 1918.

If the applications MLM 218 is not the intended recipient, then the message is sent to the application server 226 at step 1920 and communicates with the application server communication module 214. If the communication is successful as determined by step 1930, then a returns accepted message is generated at step 1918. If the communication is not successful, then a returns rejected message is generated at step 1932.

Referring again to FIG. 11, messages on the reverse path through the remote services system 100 (i.e., from the application server 226 toward the customer network) are transmitted over the back-channel. Back-channel communication applies to session module communication as the message mode has no back-channel. Some message types (e.g., administrative control or bulk transfer request/response) may have multiple destinations, representing a group. The remote services system 100 optimizes the transfer of such messages to reduce network traffic.

Figure 20:
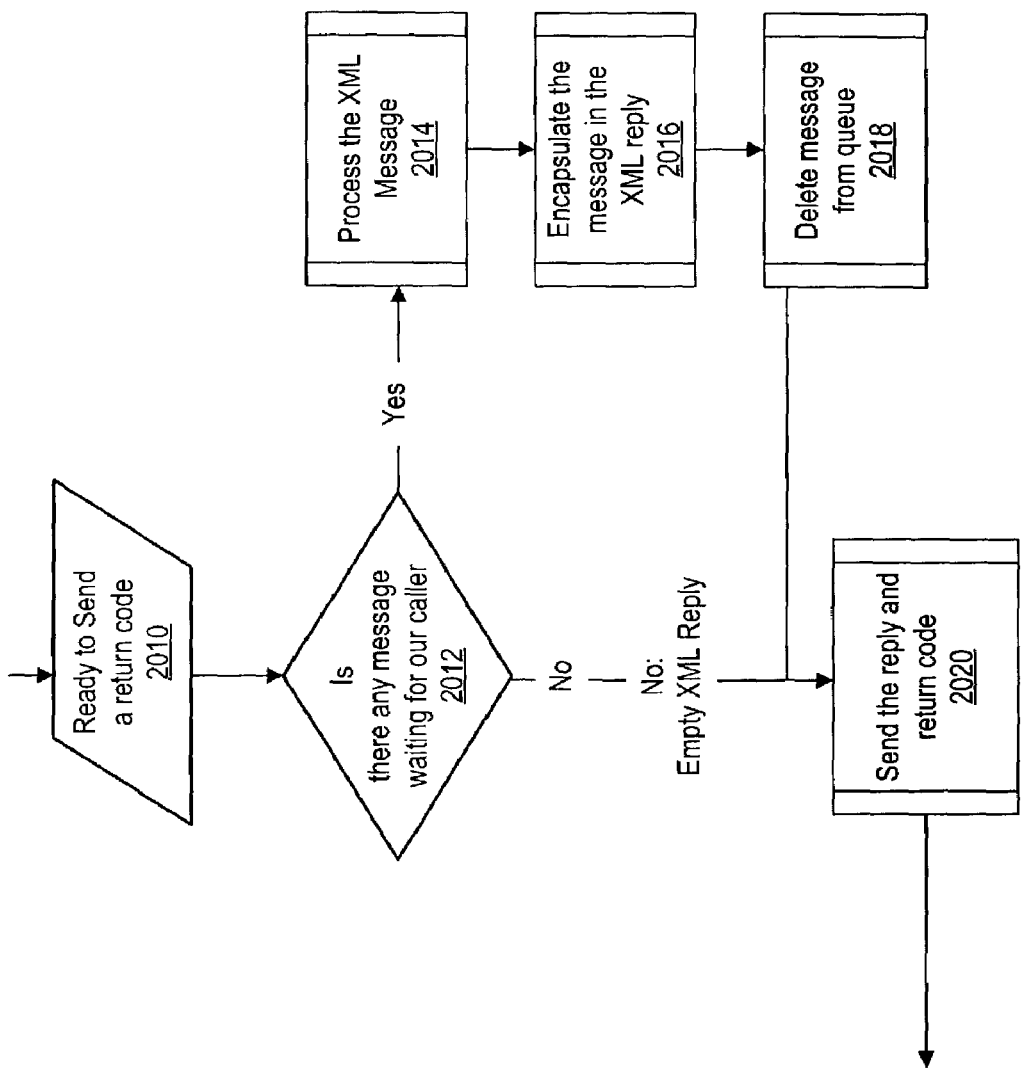
FIG. 20 shows the data flow for the back-channel sending process.

FIG. 20 shows the data flow for the back-channel sending process. Messages are transmitted from a downstream component to the other upstream components over the back-channel. Each HTTP post request may have in its reply a block of data, in this case an XML formatted message.

The back-channel data is transmitted as a reply to an existing request. To send data over the back-channel, the remote services system 100 has, on each component of the path from the data destination to its application MLM 218, to spool the back-channel data until the next component opens a connection. Sending back-channel data is part of the returns steps 1618, 1710, 1816, 1834, 1918, 1932.

During the back-channel process, the component determines whether it is ready to send the return code at step 2010. In addition to returning the appropriate code to the sender, the control back-channel determines whether there are any messages waiting for this sender in reply at step 2012. If there are messages waiting, then the component processes the XML message at step 2014. The component then encapsulates the message in an XML reply at step 2016 and deletes the message from the queue at step 2018. The component then sends the message and return code at step 2020.

If there were no messages waiting, then the component sends the return code along with an empty XML reply at step 2020. Reception of the back-channel message is done while the requester is receiving a return status from a synchronous HTTP command. Back-channel queues are interrogated for any pending messages that belong to the caller. When an intermediate MLM 216 calls in, it receives all the back-channel messages for any component reachable through that MLM.

Figure 21A:
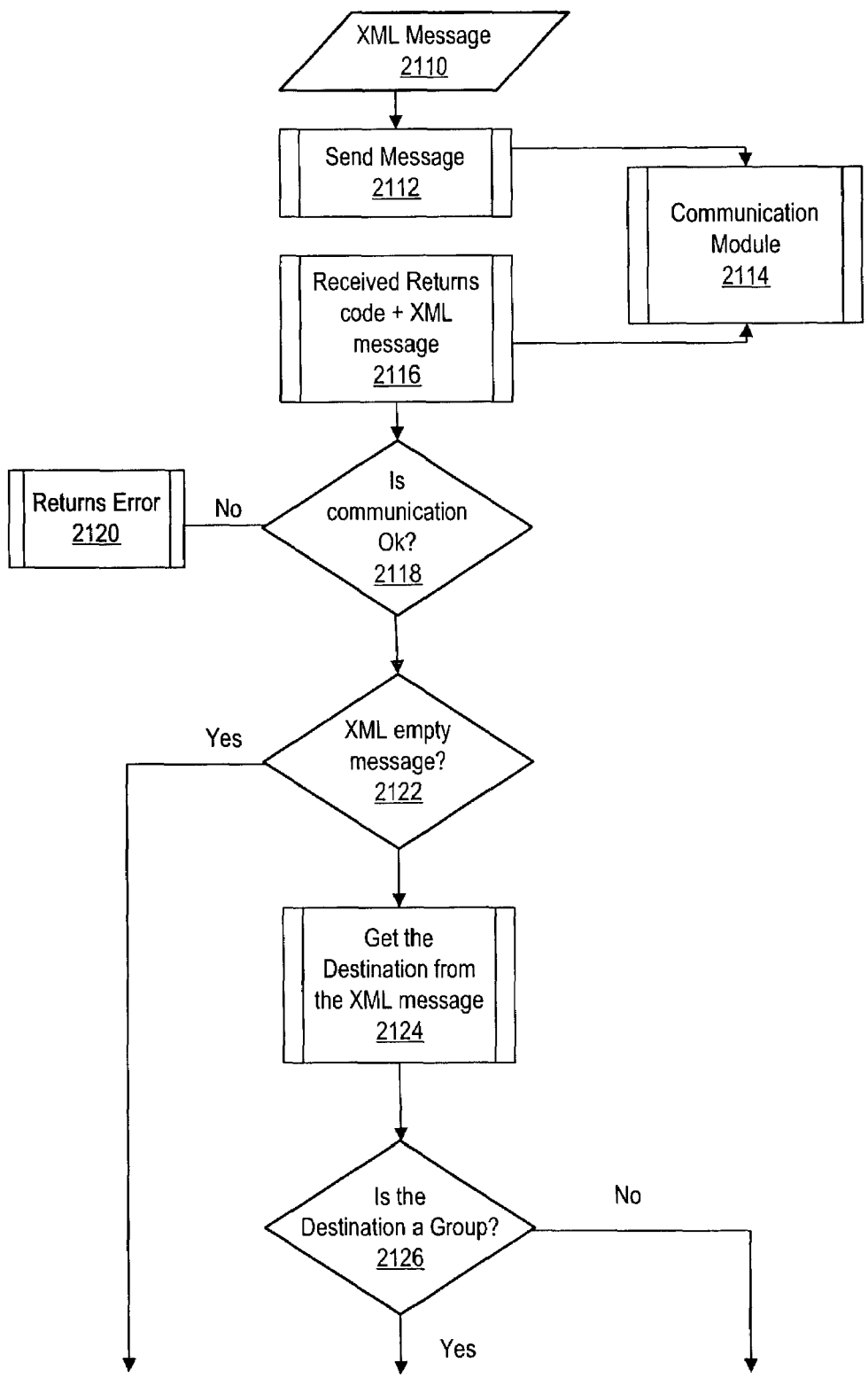
FIGS. 21A and 21B show a flow chart of controlling message address expansion for groups.
Figure 21B:
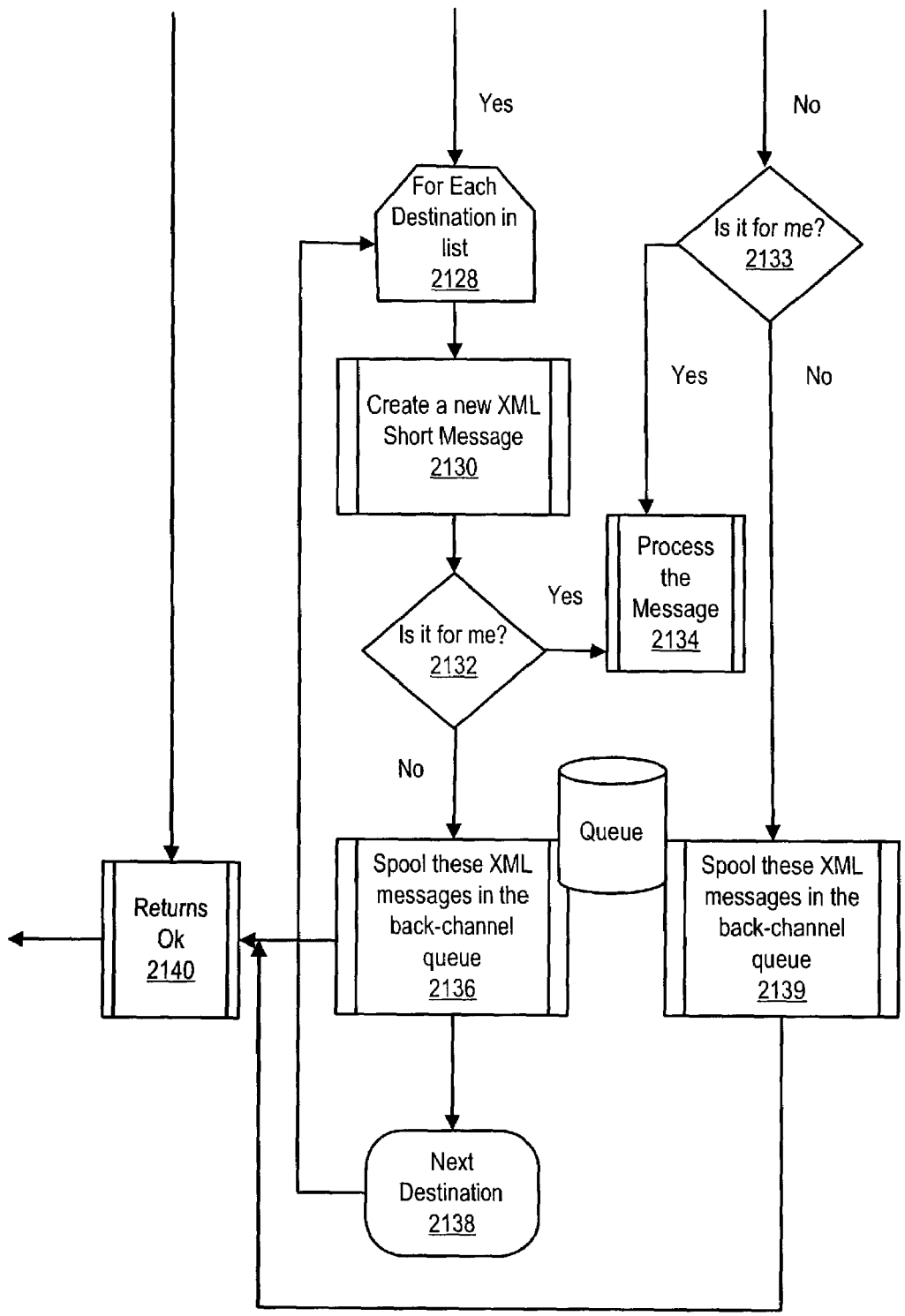

FIGS. 21A and 21B show a flow chart of controlling message address expansion for groups. More specifically, messages from the applications MLM 218 or other remote services components which are in the class of software update requests or configuration change requests (i.e., control messages) are often intended for a group of components rather than an individual component. The remote services system 100 optimizes network traffic by allowing such control messages to use a group as their destination. The intermediate MLM 216 expands this group and redistributes the control message to each of the group members.

More specifically, steps 2110–2124 are as describe above. At step 2124, when the destination is obtained, then at step 2126 the MLM determines whether the destination is a group. If the destination is for a group, then a loop is entered for the group at step 2130. A new short message is created for each destination in the group at step 2130. The message is also reviewed to determine whether the message is intended for the MLM at step 2132. If the message is for intended for the MLM then the message is processed at step 2134. If the message is not intended for the MLM then the shot message is spooled to the queue at step 2136. After the message is spooled to the queue, then the group is reviewed to determine whether there are any additional destinations in the group at step 2138. After the loop has completed then control transfer to returns step 2140 which functions as discussed above.

While control messages are inserted into the back-channel queue in the send block, the control messages are redistributed to their destination by the return block as discussed with reference to FIG. 17. The remote services system 100 examines the content of a control message to optimize bulk data transfer when the destination of the transfer is a group.

Bulk data transfer may also occur in a number of situations including bulk data, software update and configuration change. With bulk data, bulk data may be transferred from a serviced host (e.g., the host to which the systems management platform is coupled) to the applications MLM 218. With a software update, when new or updated software package become available it is desirable to distribute the software update to the various remote services components. With a configuration change, when something has changed on the customer configuration, a new configuration file may be pushed out to all impacted remote services components. With the bulk data situation, the data is transferred from the customer network to the applications MLM 218. With the software update situation and the configuration change situation the data is transferred from the application server 226 to the remote services components on the path to the customer network.

Because bulk data transfers may be network and disk space intensive, the remote services system 100 uses a preauthorization process. With the preauthorization process each component wishing to perform a bulk data transfer first obtains an authorization before starting the actual transfer. The component uses a short message to request the bulk data transfer and provides the opportunity for any component on the transfer path to reject the authorization request. During a bulk data transfer, none of the components on the transfer path have access to the bulk data content, because this content has no meaning to the components other than to the intended recipient.

Figure 22:
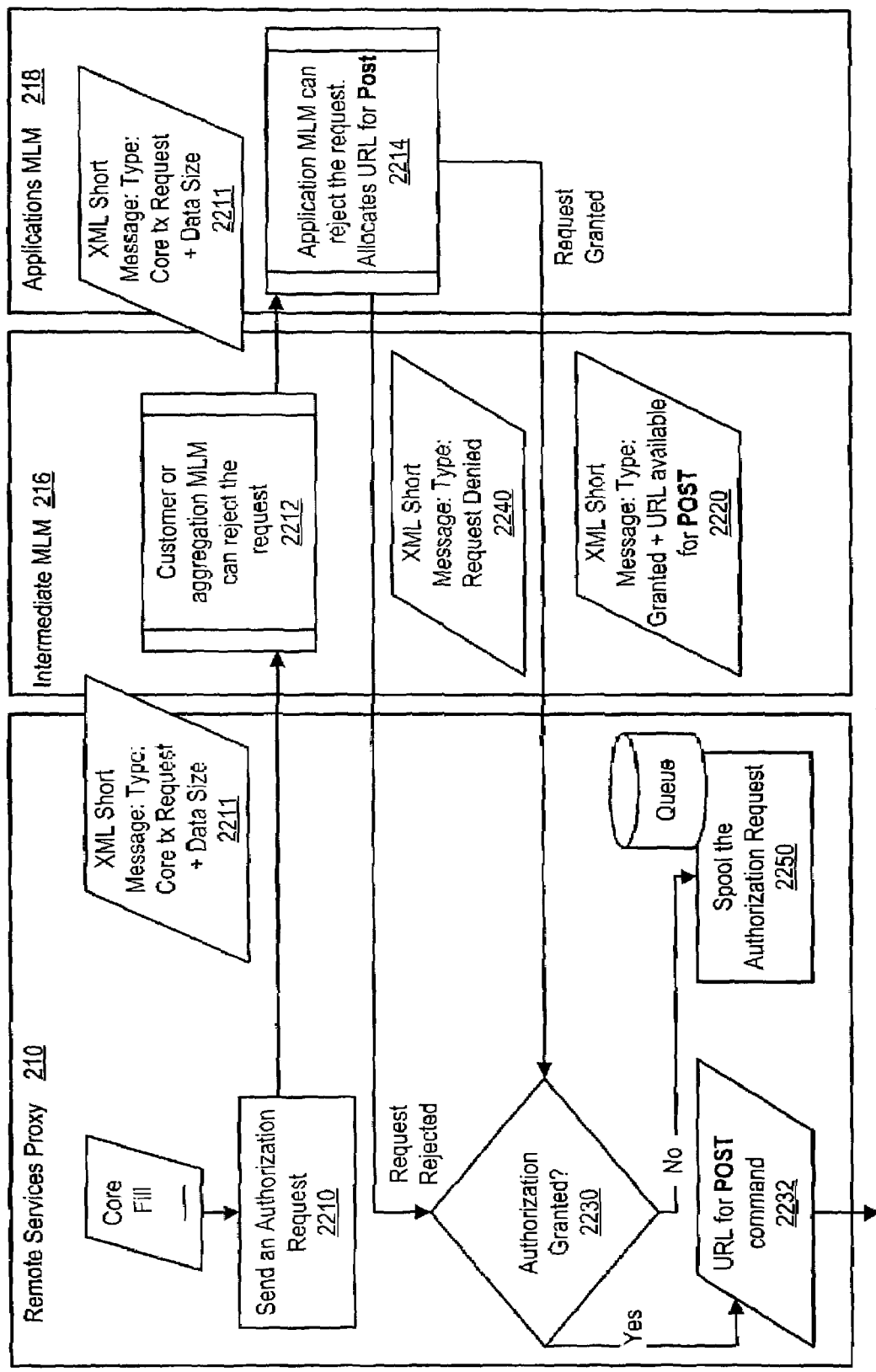
FIG. 22 shows a flow chart of the authorization process of a bulk data transfer from a customer.

More specifically, referring to FIG. 22, a bulk data transfer from the customer network is started by the proxy 210 sending an authorization request at step 2210 to the intermediate MLM 216 using an XML short message 2211. The short message includes the core request as well as the data size. The intermediate MLM 216 may reject the request at step 2212. The intermediate MLM 216 also passes the short message 2211 on to the applications MLM 218 which may reject the request at step 2214. If the request is granted then the applications MLM 218 allocates a URL for POST and sends a short message 2220 back to the proxy 210 indicating that the request was granted as well as the allocated URL available for the POST of the bulk data transfer. The proxy 210 reviews the returned message to determine whether the request was granted at step 2230. If the request was granted then the URL for the POST command is generated at step 2232.

If the authorization request is denied (e.g., via short message 2240), then the request is spooled at step 2250 by the proxy 210 for retry, a queue processing watchdog resubmits authorization request.

Figure 23:
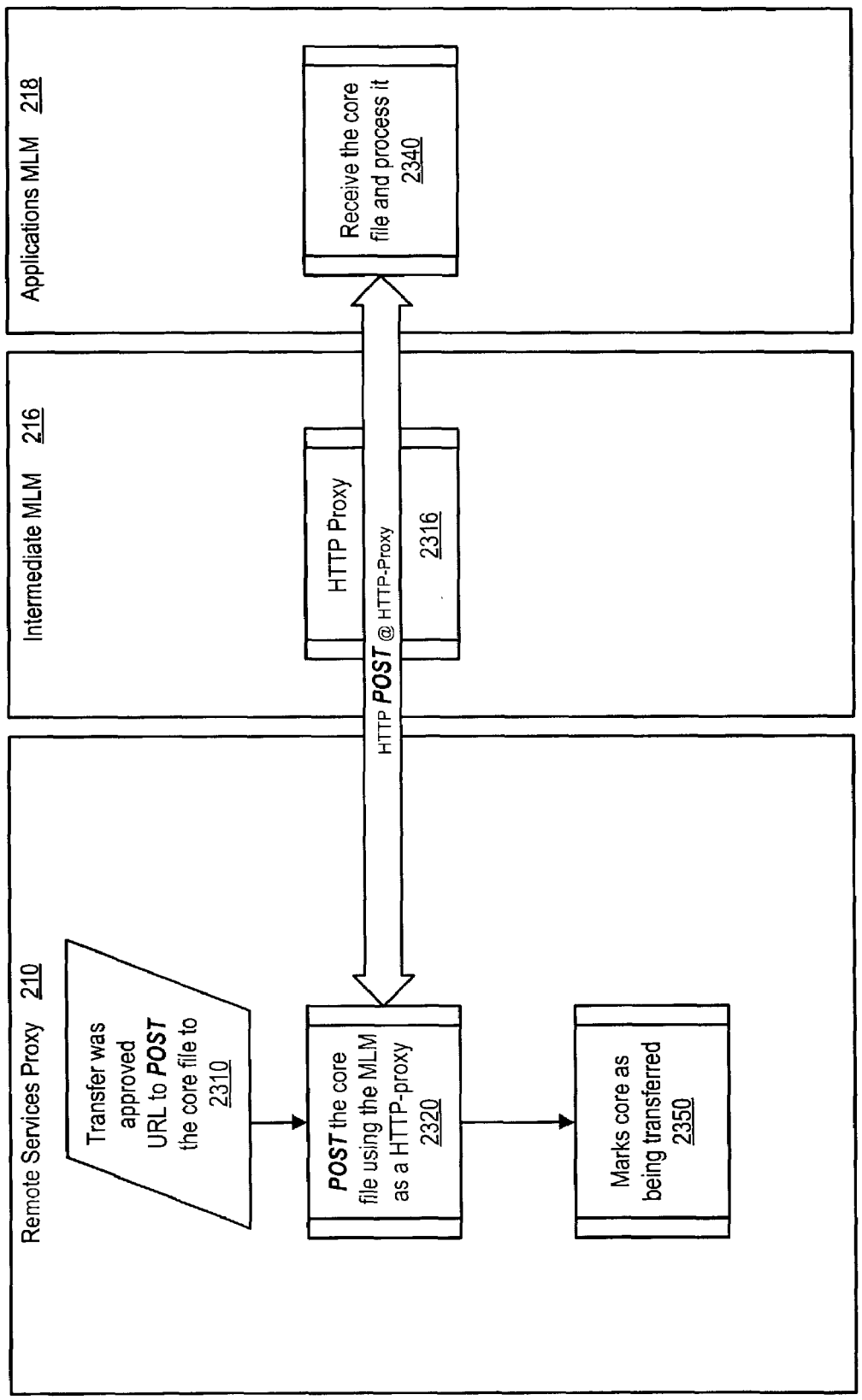
FIG. 23 shows a flow chart of the data flow of a bulk data transfer from a proxy.

Referring to FIG. 23, when the authorization has been approved at step 2310, the proxy 210 initiates the transfer. The transfer occurs between the proxy 210 and the applications MLM 218, which are coupled via the intermediate MLM 216. The bulk data transfer is a one to one transfer as compared to redistributing files to multiple destinations. The data flow of a bulk transfer is substantially the same as for short messages; however, the amount of data transferred may be extremely large. Accordingly, a protocol is used to avoid instantiating the bulk data in the intermediate MLM 216. The remote services system 100 POSTs the core file using the intermediate MLM 216 as an HTTP proxy 23 16 at step 2320 to enable an efficient transmission of the bulk data. The applications MLM 218 receives the core file and processes the core file at step 2340. After the proxy 210 transfers the file, the proxy 210 marks the core as being transferred at step 2350.

Figure 24:
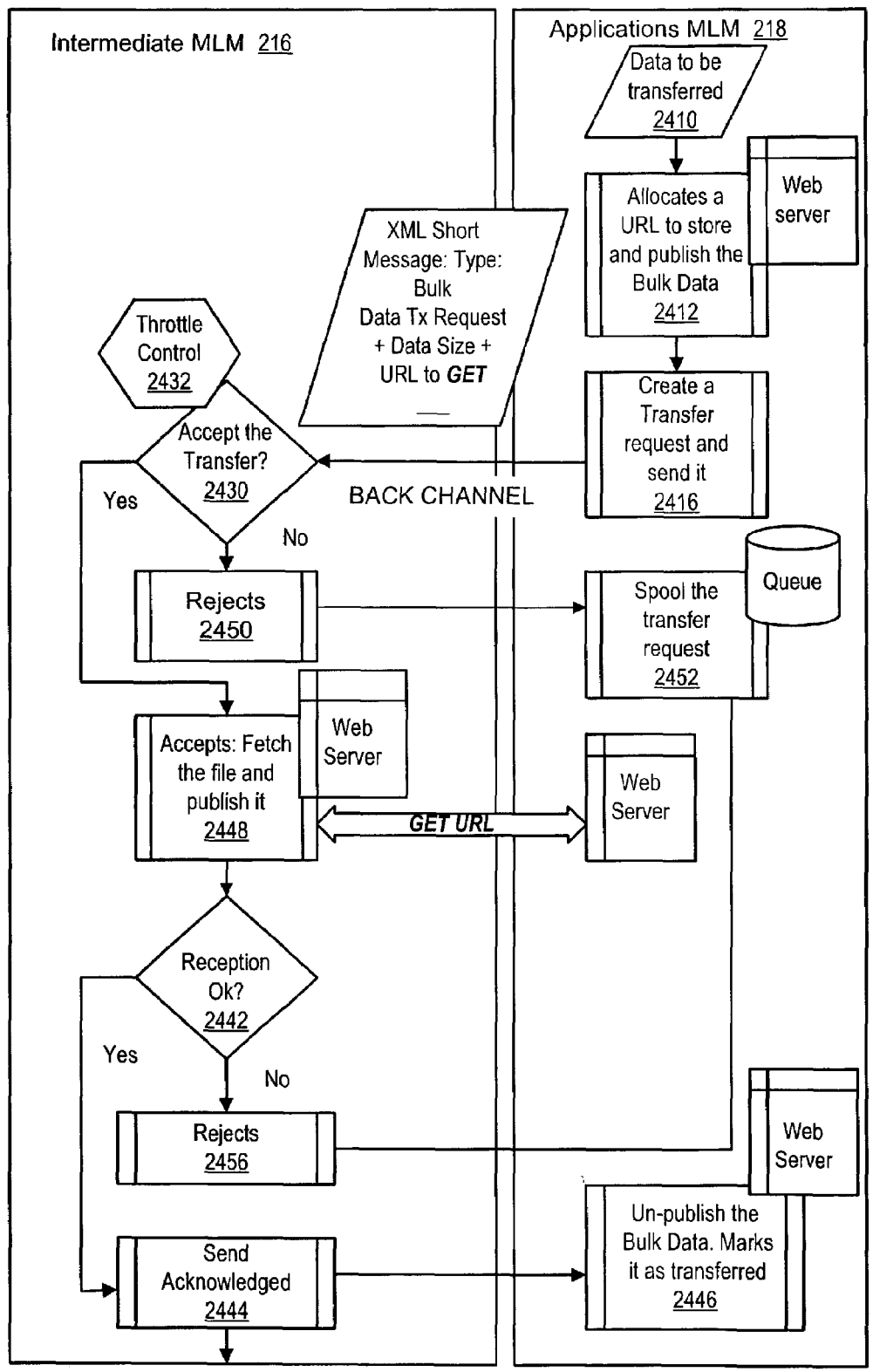
FIG. 24 shows a flow chart of the authorization process of a bulk data transfer from the remote services system.

Referring to FIG. 24, with the configuration or software download situation, the applications MLM 218 initiates the transfer request. To minimize network traffic and as most of these downloads target more than one component, the remote services system 100 proceeds by fetching the data to the nearest intermediate MLM 216 which is then responsible for redistributing the data to the final destination (i.e., the intermediate MLM 216 performs the multicast).

More specifically, the applications MLM allocates a URL to store and publish the bulk data to be transferred 2410 at step 2412 using a web server 2414. The applications MLM 218 then creates a transfer request and sends the request via the back-channel at step 2416. The short message 2420 requesting the transfer includes the data transfer request, the data size and the URL location for obtaining the data. The intermediate MLM 216 can then determine whether to accept the transfer at step 2430. The throttle control 2432 assists in determining whether to accept the transfer. If the intermediate MLM 216 accepts the transfer then the intermediate MLM fetches the file and publishes the file at step 2440. The intermediate MLM 216 then determines whether the reception was okay at step 2442. If the reception was okay, then the intermediate MLM 216 sends an acknowledgement at step 2444. The applications server then unpublishes the data and marks the data as transferred at step 2446.

If the intermediate MLM 216 rejects the transfer at step 2450, then the intermediate MLM 216 so informs the applications MLM 218, which spools the transfer request at step 2452. Additionally, if the reception of the data transfer was not okay as determined by step 2442, then the intermediate MLM 216 so informs the applications MLM 218 at rejects step 2456. The applications MLM 218 then spools the transfer request at step 2442.

Figure 25A:
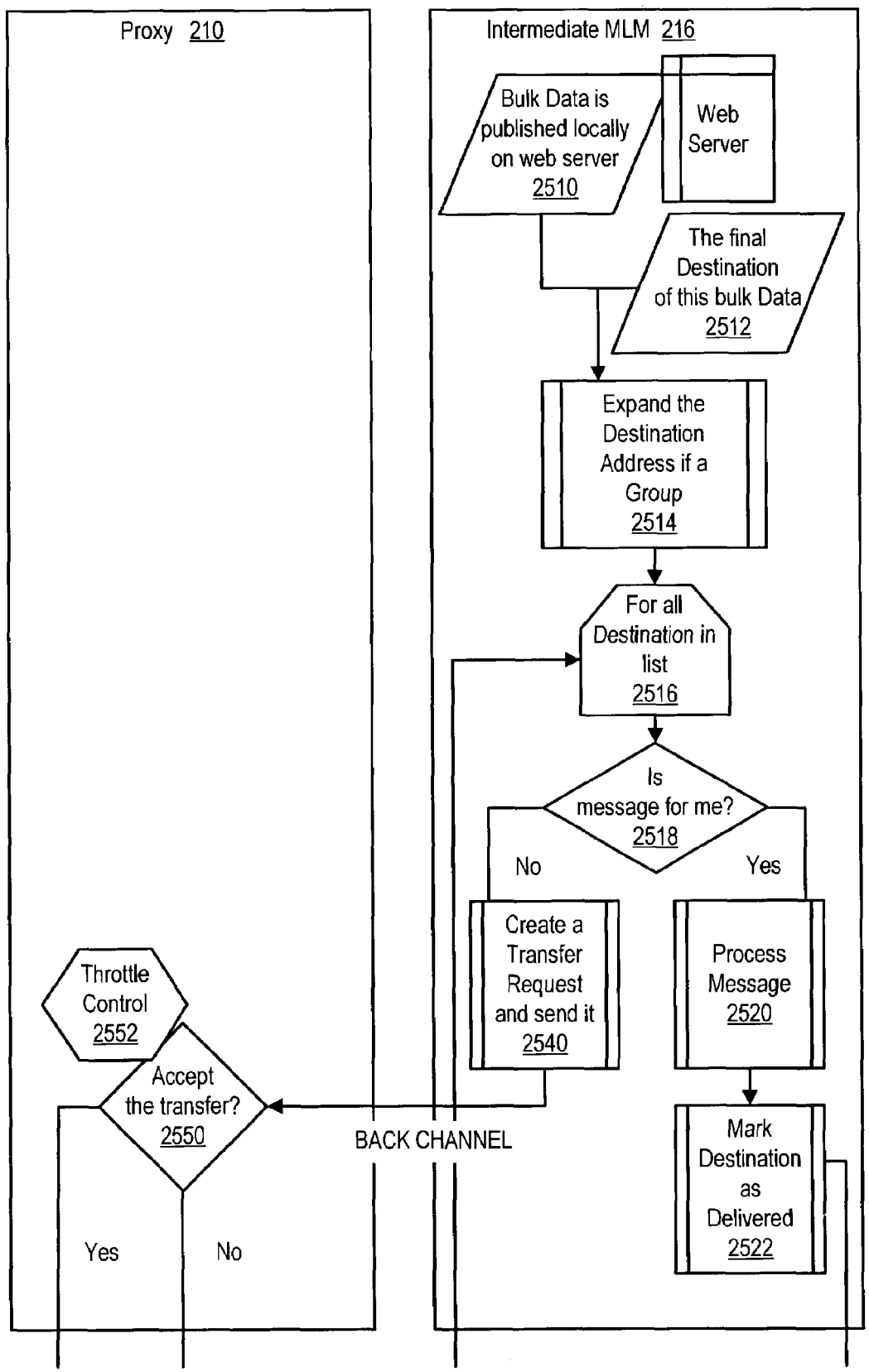
FIGS. 25A and 25B show a flow chart of the data flow of the bulk data transfer from the remote services system.
Figure 25B:
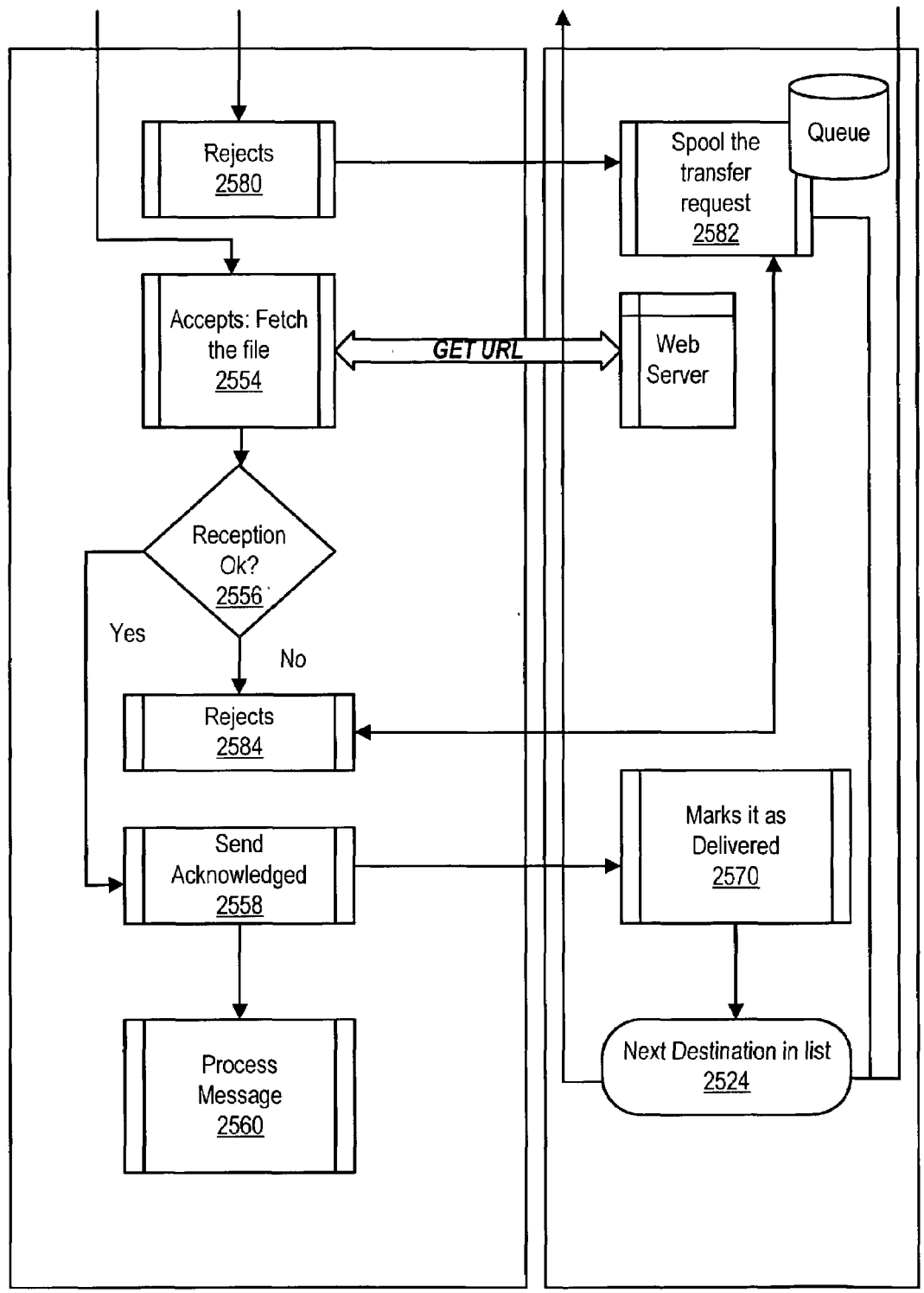

FIGS. 25A and 25B show the fetch in more detail. More specifically, the bulk data is published locally on the web server at step 2510. The final destination of the bulk data is determined at step 2512. If the destination address is a group, then the destination is expanded at step 2514. Next the intermediate MLM 216 processes the data for all destinations that were expanded at step 2516. The intermediate MLM 216 determines whether the message is intended for the intermediate MLM at step 2518. If so, then the message is processed at step 2520, the destination is marked as delivered at step 2522 and the loop proceeds to the next destination on the list at step 2524.

If the destination of the message is not the intermediate MLM 216, then the intermediate MLM creates a transfer request and sends the request to the proxy 210 at step 2540. The proxy 210 then determines whether to accept the transfer at step 2550 using throttle control 2552. If the proxy accepts the transfer then the proxy fetches the file at step 2554 and determines whether the reception was okay at step 2556. If the reception was okay then the proxy 210 sends an acknowledgement to the intermediate MLM 216 at step 2558 and processes the message at step 2560. When the intermediate MLM 216 receives the acknowledgement then the intermediate MLM 216 marks the message as delivered at step 2570 and proceeds to the next destination on the list step 2524.

If the proxy 210 rejects the transfer at step 2580, then the proxy 210 so informs the intermediate MLM 216, which spools the transfer request at step 2482. Additionally, if the reception of the data transfer was not okay as determined by step 2456, then the proxy 210 so informs the intermediate MLM 216 at rejects step 2484. The intermediate MLM 216 then spools the transfer request at step 2482.

Regarding the throttle control, the remote services system 100 can limit network connections based on either static data or dynamically calculated parameters. Static data include, for example, time of day. Dynamically calculated parameters include, for example, total bytes sent, message sent, etc. For a customer MLM that is part of a customer MLM farm, these dynamic parameters are shared to reflect the total network usage. The throttle modules 2432, 2552 base their decision of whether to accept or reject a connection on this shared data and other local data such as disk space available.

The optimal solution for prioritizing data flow and managing bandwidth in the remote services system 100 is articulated between two axes: The first axis relates to the establishment of the connection controlled by the system's throttle described in greater detail below. The other axis relates to the real-time bandwidth control and QoS control by the service provider's bandwidth management.

Figure 26:
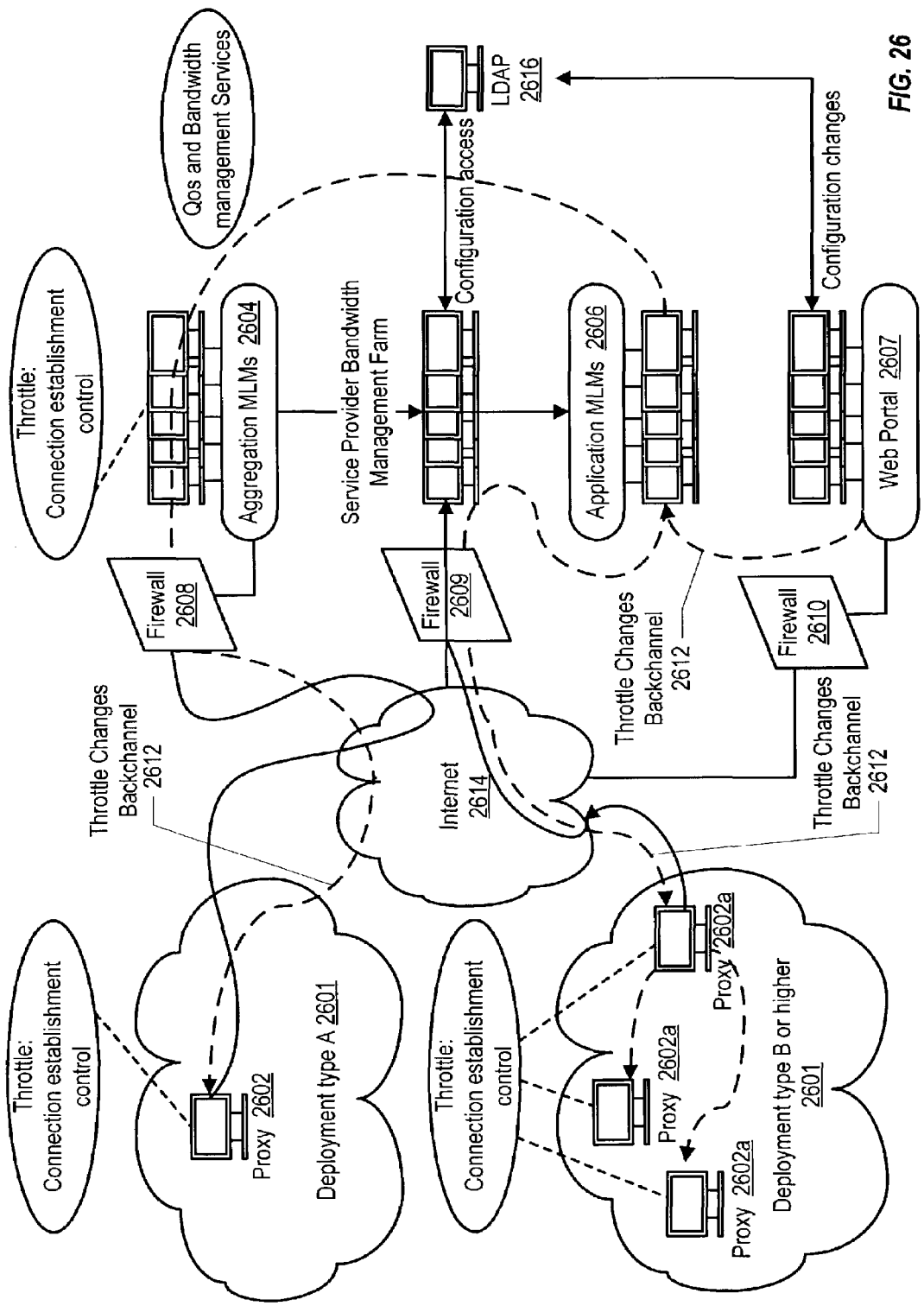
FIG. 26 is an illustration of an optimal architecture for prioritizing data flow and managing bandwidth in the remote services system.

FIG. 26 is an illustration of an optimal architecture for prioritizing data flow and managing bandwidth in the remote services system 100. Two embodiments of the customer deployment are illustrated. Deployment "Type A" 2601 comprises a single proxy 2602. Deployment "Type B" 2603 comprises multiple proxies 2602a. The components on the service provider side include aggregation MLMs 2604, a service provider bandwidth management farm 2605, application MLMs 2606, and a service provider web portal 2607.

As shown in FIG. 26, throttle control in the customer deployment is provided by the proxies 2602 and 2602a. On the service provider side, throttle control is provided by the aggregation MLMs 2604. The "throttle changes" back-channel is illustrated generally by dashed line 2612 communicated by the system through the internet 2614. Three firewalls protect the service provider system components in the embodiment shown in FIG. 26. Firewall 2608 protects the aggregation MLMs 2604; firewall 2609 protects the bandwidth management farm 2605 and application MLMs 2606; and firewall 2610 protects the service provider web portal 2607.

The default values for bandwidth allocated to the system is part of the customer registration and can change or be refined through the service provider web administration portal 2607. Changes are pushed down to the system infrastructure components through the back-channel while configuration values for the service provider bandwidth farm 2605 are stored on a Lightweight Directory Assistance Protocol server (L26P) 2606 residing in the remote services system 100 data center.

The service provided by the bandwidth management farm 2605 is shared by all types of deployments. Its configuration is driven by the service provider web administration portal 2607 and its complexity is hidden from the end user. It is located in a remote services system 100 datacenter and managed by the service provider. Default rules for this service include a prioritization of the short messages over bulk data transfer and maintenance of maximum bandwidth usage. The architecture illustrated in FIG. 26 is generic, scalable and localized enough to be upgraded as needed.

OTHER EMBODIMENTS

Other embodiments are within the following claims.

What is claimed is:

1. A system for managing bandwidth in a remote services system comprising:
    a throttle module operable to control transfer of data within said remote services system in accordance with predetermined quality of service parameters;
    a queuing module for ranking files in accordance with predetermined priority parameters, said queuing module operating in conjunction with said throttle module to control access to system bandwidth;
    a first communications network;
    a remote services proxy operable to generate a request to transfer data;
    an aggregation mid-level manager operable to communicate with said remote services proxy over said first network and to receive said request to transfer data therefrom;
    a second communications network;
    an applications mid-level manager operable to communicate with said aggregation mid-level manager over said second communications network and to receive said request therefrom, said aggregation mid-level manager being operable to authorize transfer of data in accordance with predetermined parameters and to control operation of said throttle module to maintain a predetermined quality of service for data transfer; and
    wherein said priority parameters used by said queuing module comprising precedence and persistence attributes specified in accordance with predetermined quality of service parameters.

2. The system according to claim 1, further comprising a back-channel data path for implementing access control over system bandwidth by said throttle module.

3. The system of claim 1, wherein said application mid-level manager operates in an intermediate mid-level manager farm having a plurality of intermediate mid level managers.

4. The system of claim 3, wherein the intermediate mid-level manager farm uses a shared session object to share information among the plurality of intermediate mid-level managers within the intermediate mid level manager farm.

5. The system of claim 4 wherein the shared session object includes a local resource locater identifying the proxy that generated the request to transfer data within said remote services system.

6. The system of claim 1 wherein the data transferred in said remote services system comprises data that has been converted from email protocol to HTTP protocol.

7. An architecture for managing bandwidth in a remote services system comprising:
    a throttle module operable to control transfer of data within said remote services system in accordance with predetermined quality of service parameters;
    a queuing module for ranking files in accordance with predetermined priority parameters, said queuing module operating in conjunction with said throttle module to control access to system bandwidth;
    a first communications network;
    a remote services proxy operable to generate a request to transfer data;
    an aggregation mid-level manager operable to communicate with said remote services proxy over said first network and to receive said request to transfer data therefrom;
    a second communications network;
    an applications mid-level manager operable to communicate with said aggregation mid-level manger over said second communications network aggregation, said aggregation mid-level manager being operable to receive said request to transfer data and to control operation of said throttle and said queuing modules to control bandwidth allocation for data transmission over said remote services; and
    wherein said priority parameters used by said queuing module comprising precedence and persistence attributes specified in accordance with predetermined quality of service parameters.

8. The architecture according to claim 7, further comprising a back-channel data path for implementing access control over system bandwidth by said throttle module.

9. The architecture according to claim 8, further comprising a directory assistance protocol server for controlling access to configuration parameters relating to bandwidth allocation in said remote services system.

10. The architecture according to claim 9, further comprising an internet web access portal to provide a user with controlled access to said directory assistance protocol server to change said bandwidth allocation parameters.

11. The system of claim 7 wherein the data transferred in said remote services system comprises data that has been converted from email protocol to HTTP protocol.

12. An architecture for prioritizing data flow in a remote services system comprising:
- a throttle module operable to control transfer of data within said remote services system in accordance with predetermined quality o f service parameters;
- a queuing module for ranking files in accordance with predetermined priority parameters, said queuing module operating in conjunction with said throttle module to control access to system;
- a first communications network;
- a plurality of remote service proxies operable to generate a plurality of requests to transmit data;
- an aggregation mid-level manager operable to communicate with said plurality of remote services proxies over said first network and to receive said plurality of requests to transfer data therefrom;
- a second communications network;
- an applications mid-level manager operable to communicate with said aggregation mid-level manager over said second communications network and to receive said plurality of requests to transmit data therefrom, said applications mid-level manager operating in conjunction with said queuing module and said aggregation mid-level manager to control operation of said plurality of remote services proxies to prioritize data transmission over said remote services system; and
- wherein said priority parameters used by said queuing module comprising precedence and persistence attributes specified in accordance with predetermined quality of service parameters.

13. The architecture according to claim 12, further comprising a back-channel data path for implementing access control over system bandwidth by said throttle module.

14. The architecture according to claim 13, further comprising a directory assistance protocol server for controlling access to configuration parameters relating to bandwidth allocation in said remote services system.

15. The architecture according to claim 14, further comprising an internet web access portal to provide a user with controlled access to said directory assistance protocol server to change said bandwidth allocation parameters.

16. The architecture according to claim 12 wherein the data transferred in said remote services system comprises data that has been converted from email protocol to HTTP protocol.

17. A method for managing bandwidth in a remote services system, comprising:
- generating a request to transfer data from a remote services proxy of said remote services system;
- transmitting said request to transfer data over a first communications network;
- receiving said request by an aggregation mid-level manager of said remote services system;
- using said aggregation mid-level manager to transmit said request over a second communications network;
- receiving said request bean applications mid-level manager, said aggregation mid-level manager being operable to control operation of a throttle module to maintain a predetermined quality of service for data transfer;
- using a queuing module for ranking files in accordance with predetermined priority parameters, said queuing module operating in conjunction with said throttle module to control access to system; and
- wherein said priority parameters used by said queuing module comprising precedence and persistence attributes specified in accordance with predetermined quality of service parameters.

18. The method according to claim 17, further comprising using a back-channel data path for implementing access control over system bandwidth by said throttle module.

19. The method according to claim 17 wherein the data transferred in said remote services system comprises data that has been converted from email protocol to HTTP protocol.

* * * * *

UNITED STATES PATENT AND TRADEMARK OFFICE
CERTIFICATE OF CORRECTION

PATENT NO. : 7,181,455 B2 Page 1 of 1
APPLICATION NO. : 10/185558
DATED : February 20, 2007
INVENTOR(S) : Michael J. Wookey, Trevor Watson and Jean Chouanard It is certified that error appears in the above-identified patent and that said Letters Patent is hereby corrected as shown below:

Column 1, line 51, "10/066,075" should be --10/066,975--

Column 28, line 54, "manger" should be --manager--

Column 29, line 16, "o f" should be --of--

Column 30, line 23, "bean" should be --by an--

Signed and Sealed this

Twenty-fourth Day of April, 2007

JON W. DUDAS
*Director of the United States Patent and Trademark Office*